United States Patent
Takase et al.

(10) Patent No.: US 9,106,523 B2
(45) Date of Patent: Aug. 11, 2015

(54) COMMUNICATION DEVICE AND METHOD OF CONTROLLING THE SAME

(71) Applicant: Hitachi, Ltd., Tokyo (JP)

(72) Inventors: Masayuki Takase, Yokohama (JP); Tetsuya Uda, Yokohama (JP); Takayuki Kanno, Yokohama (JP); Kenji Fujihira, Yokohama (JP)

(73) Assignee: HITACHI, LTD., Tokyo (JP)

( * ) Notice: Subject to any disclaimer, the term of this patent is extended or adjusted under 35 U.S.C. 154(b) by 166 days.

(21) Appl. No.: 13/900,799

(22) Filed: May 23, 2013

(65) Prior Publication Data

US 2013/0329547 A1 Dec. 12, 2013

(30) Foreign Application Priority Data

May 29, 2012 (JP) ................................. 2012-122030

(51) Int. Cl.
*H04L 12/26* (2006.01)
*H04L 12/24* (2006.01)

(52) U.S. Cl.
CPC .................................. *H04L 41/0654* (2013.01)

(58) Field of Classification Search
None
See application file for complete search history.

(56) References Cited

U.S. PATENT DOCUMENTS

| 7,936,770 | B1 * | 5/2011 | Frattura et al. ................. 370/412 |
| 8,780,911 | B2 * | 7/2014 | Narasimhan .................. 370/392 |
| 2004/0062198 | A1 * | 4/2004 | Pedersen et al. ............... 370/229 |
| 2005/0276263 | A1 * | 12/2005 | Suetsugu et al. ............... 370/389 |
| 2008/0016402 | A1 * | 1/2008 | Harel et al. ...................... 714/43 |
| 2008/0056250 | A1 * | 3/2008 | Takase et al. .................. 370/389 |
| 2008/0285555 | A1 * | 11/2008 | Ogasahara ..................... 370/389 |
| 2009/0303883 | A1 * | 12/2009 | Kucharczyk et al. .......... 370/241 |
| 2011/0093579 | A1 * | 4/2011 | Koizumi et al. ............... 709/223 |
| 2011/0194562 | A1 * | 8/2011 | Simmons et al. ......... 370/395.31 |
| 2011/0299396 | A1 * | 12/2011 | Yan et al. ....................... 370/235 |

FOREIGN PATENT DOCUMENTS

JP 2008-160227 A 7/2008

OTHER PUBLICATIONS

International Telecommunication Union, "Ethernet linear protection switching", Telecommunication Standardization Sector of ITU, G.8031/Y.1342, Jun. 2011.

* cited by examiner

*Primary Examiner* — Anh-Vu Ly
(74) *Attorney, Agent, or Firm* — Volpe and Koenig, P.C.

(57) ABSTRACT

Provided is a communication device including a plurality of physical ports, the communication device holding information for associating each of at least one logical port and at least two physical ports, the communication device being configured to: identify, when any one of the plurality of physical ports receives data including user data, one of the at least one logical port as an output destination of the data based on destination information included in the received data; select, based on the data, one of the at least two physical ports associated with the identified logical port as an destination of the data; generate coupling check data relating to one of the plurality of physical ports; transmit the coupling check data from the one of the plurality of physical ports; and transmit data including the user data from the physical port selected by a first processing unit as the output destination.

12 Claims, 24 Drawing Sheets

LOGICAL PORT OPERATION STATE HOLDING TABLE

| LA-ID (LOGICAL PORT ID) | OPERATION STATE |
|---|---|
| 1 | ACT |
| 2 | SBY |
| 3 | |
| 4 | |
| ..... | |
| m | |

*Fig. 10*

PHYSICAL PORT MANAGEMENT TABLE

| PHYSICAL PORT ID | LINK LAYER OAM | STATUS | LA ID | LA SETTING | LINK NAME |
|---|---|---|---|---|---|
| 1 | ENABLED | NORMAL | 1 | ENABLED | WORKING |
| 2 | ENABLED | NORMAL | 1 | ENABLED | WORKING |
| 3 | ENABLED | NORMAL | 1 | ENABLED | WORKING |
| 4 | ENABLED | NORMAL | 1 | ENABLED | WORKING |
| .... | | | | | |
| n | | | | | |

*Fig. 11*

PHYSICAL PORT MANAGEMENT TABLE

| PHYSICAL PORT ID | LINK LAYER OAM | STATUS | LA ID | LA SETTING | LINK NAME | OAM LEVEL |
|---|---|---|---|---|---|---|
| 1 | ENABLED | NORMAL | 1 | ENABLED | WORKING | 4 |
| 2 | ENABLED | NORMAL | 1 | ENABLED | WORKING | 4 |
| 3 | ENABLED | NORMAL | 1 | ENABLED | WORKING | 4 |
| 4 | ENABLED | NORMAL | 1 | ENABLED | WORKING | 4 |
| .... | | | | | | |
| n | | | | | | |

*Fig. 20*

COMMUNICATION DEVICE AND METHOD OF CONTROLLING THE SAME

CLAIM OF PRIORITY

The present application claims priority from Japanese patent application JP2012-122030 filed on May 29, 2012, the content of which is hereby incorporated by reference into this application.

BACKGROUND OF THE INVENTION

This invention relates to a communication device to be used for a communication network, and more particularly, to a communication device for configuring a link aggregation port to be redundant, which is constructed by using the link aggregation for virtually binding a plurality of physical links to use the plurality of physical links as if the physical links were a single link.

In recent years, the number of forms of providing IT services by using communication networks represented by the cloud service is increasing. For the IT services using the communication networks, a response at the time of using the service and continuity are important, and high speed communication and high reliability are thus required for the communication networks.

As a technology for enhancing a communication bandwidth, the link aggregation is known (refer to Japanese Patent Application Laid-open No. 2008-160227). The link aggregation is a technology for aggregating a plurality of physical ports for coupling between two devices to use the plurality of the physical ports as one link aggregation (LA) logical port.

The link aggregation has such an advantage that a bandwidth of the one logical port is a sum of bandwidths of the aggregated individual links, resulting in an increase in bandwidth. Moreover, the link aggregation also has such an advantage of providing so-called redundancy in a communication path which operates N of the aggregated individual links as active links and operates M of the aggregated individual links as standby links so as to continue the communication on the standby link even when failures occur to some of the active links.

FIG. 2 is an explanatory diagram of the link aggregation, and specifically, illustrates an example where enhancement in communication bandwidth and a redundant configuration of physical links are realized by using six physical ports 204-1 to 204-6 belonging to interface (IF) cards 202-1 between neighboring communication devices 200-1 and 200-2 to build an LA logical port 210 between the communication devices 200-1 and 200-2.

Moreover, as the technology for configuring the physical link to be redundant, there is an Ethernet protection switching function (refer to ITU-T G.8031/Y.1342 Ethernet linear Protection Switching). The Ethernet protection switching uses the automatic protection switching (APS) protocol to configure two physical links to be redundant, and switches a communication path to a physical link in a standby system when a failure occurs on a physical link in the active system. This technology is hereinafter referred to as Ethernet APS.

FIG. 3 is an explanatory diagram of the Ethernet protection switching, and specifically, illustrates an example where redundancy is realized between physical links 304-1 and 304-2 belonging to IF cards 302-1 and 302-2 of neighboring communication devices 300-1 and 300-2 by using the Ethernet APS.

SUMMARY OF THE INVENTION

The technology described in Japanese Patent Application Laid-open No. 2008-160227 carries out the link aggregation for N+M physical links, and uses N physical links out thereof as the active links and M physical links as the standby links to realize the enhancement of the communication bandwidth and the redundancy of the physical links. In the example illustrated in FIG. 2, the physical ports 204-1 to 204-6 belonging to the IF card 201-1 construct the LA logical port, the physical ports 204-1 to 204-4 are used as ACT ports, and the physical ports 204-5 to 204-6 are used as SBY ports. The SBY port is used after the link aggregation is disabled, and the SBY port thus needs to be enabled when the ACT port fails. Therefore, there arises such a problem that a switching time period when the ACT port fails is long. Further, there arises such a problem that the communication cannot be continued when the IF card 202-1 fails.

The technology described in ITU-T G.8031/Y.1342 Ethernet linear Protection Switching builds a redundant group by using two physical links, and uses one of the physical ports as the ACT port, and the other of the physical ports as the SBY port to configure the physical ports to be redundant. In the example illustrated in FIG. 3, the physical port 304-1 belonging to the IF card 302-1 is operated as the ACT port, and the physical port 304-2 belonging to the IF card 302-2 is operated as the SBY port. The method uses the operation, administration, and maintenance function (OAM) of the Ethernet for monitoring a failure of the ACT port and the SBY port. The Ethernet OAM is a function of transmitting normality monitoring (hereinafter referred to as continuity check (CC)) frame at a constant cycle to a segment to be monitored, and when a receiving party does not receive the CC frame, the OAM determines that the segment to be monitored is failed. The Ethernet OAM is combined with the Ethernet APS to be used, and when the Ethernet OAM detects a failure in the segment to be monitored by the Ethernet OAM, the switching is carried out by the Ethernet APS function in the segment to be monitored as a unit. The technology described in ITU-T G.8031/Y.1342 Ethernet linear Protection Switching uses a failure detection in the physical port 304-1 belonging to the IF card 302-1 as a trigger to activate the Ethernet APS, and the Ethernet APS switches the physical port 304-2 belonging to the IF card 302-2 to ACT to continue the communication.

Though this method solves such a problem of Japanese Patent Application Laid-open No. 2008-160227 that the communication cannot be continued when the IF card fails, this method cannot be used to bundle a plurality of physical links to extend the bandwidth as in the link aggregation.

This invention has been made in view of the above-mentioned problem, and therefore has an object to simultaneously realize an extension of bandwidth by using the link aggregation, a decrease in switching time period when a failure occurs, and a continued service while the communication bandwidth is maintained when an IF card fails.

A typical example to be disclosed is a communication device, comprising: a plurality of physical ports for transmitting and receiving a signal to and from another communication device, the communication device holding information for associating each of at least one logical port and at least two physical ports; a reception unit for identifying, when any one of the plurality of physical ports receives data including user data, one of the at least one logical port as an output destination of the data including the user data based on destination information included in the received data; a first processing unit for selecting, by a predetermined method in which at least a part of the data including user data is used, one of the at least two physical ports associated with the identified one of the at least one logical port as an output destination of the data including the user data; and a maintenance unit for generating data for checking a coupling between one of the plurality of physical ports and the another communication device, wherein the communication device transmits the data for checking the coupling to the another communication device from the one of the plurality of physical ports, and transmits the data including the user data from the selected one of the at least two physical ports as the output destination by the first processing unit.

According to the communication device of the exemplary embodiment of this invention, it is possible to simultaneously realize the extension of bandwidth by using the link aggregation, the decrease in switching time period when the failure occurs, and the continued service while the communication bandwidth is maintained when the IF card fails.

BRIEF DESCRIPTION OF THE DRAWINGS

FIG. 10 is an explanatory diagram of a logical port operation state holding table held by the communication device according to the first embodiment of this invention.

FIG. 11 is an explanatory diagram of a physical port management table held by the communication device according to the first embodiment of this invention.

FIG. 20 is an explanatory diagram of a physical port management table held by the communication device according to the third embodiment of this invention.

DETAILED DESCRIPTION OF THE PREFERRED EMBODIMENTS

First Embodiment

Figure 1:
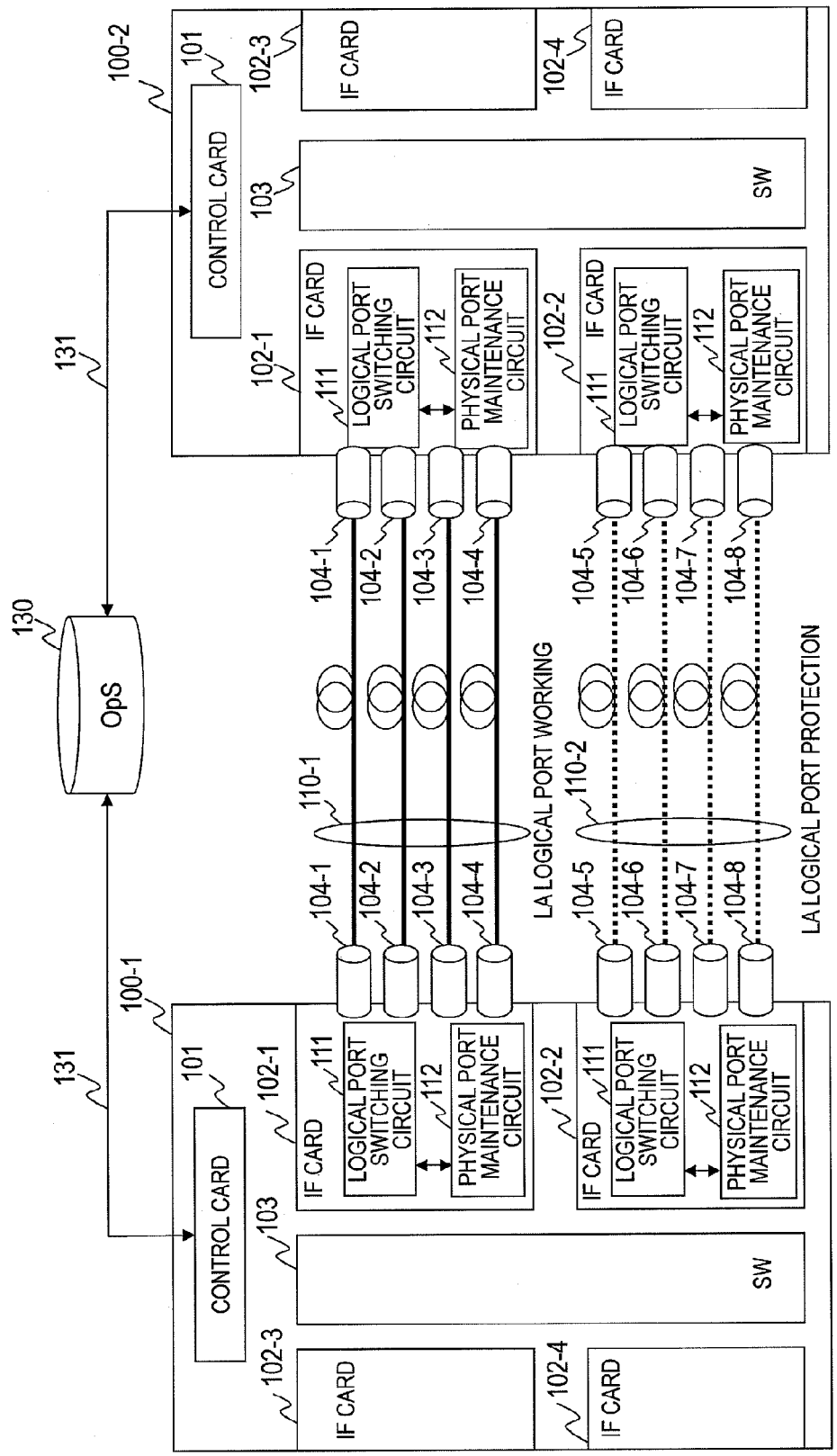
FIG. 1 is a block diagram illustrating a configuration of a communication system according to a first embodiment of this invention.
Figure 2:
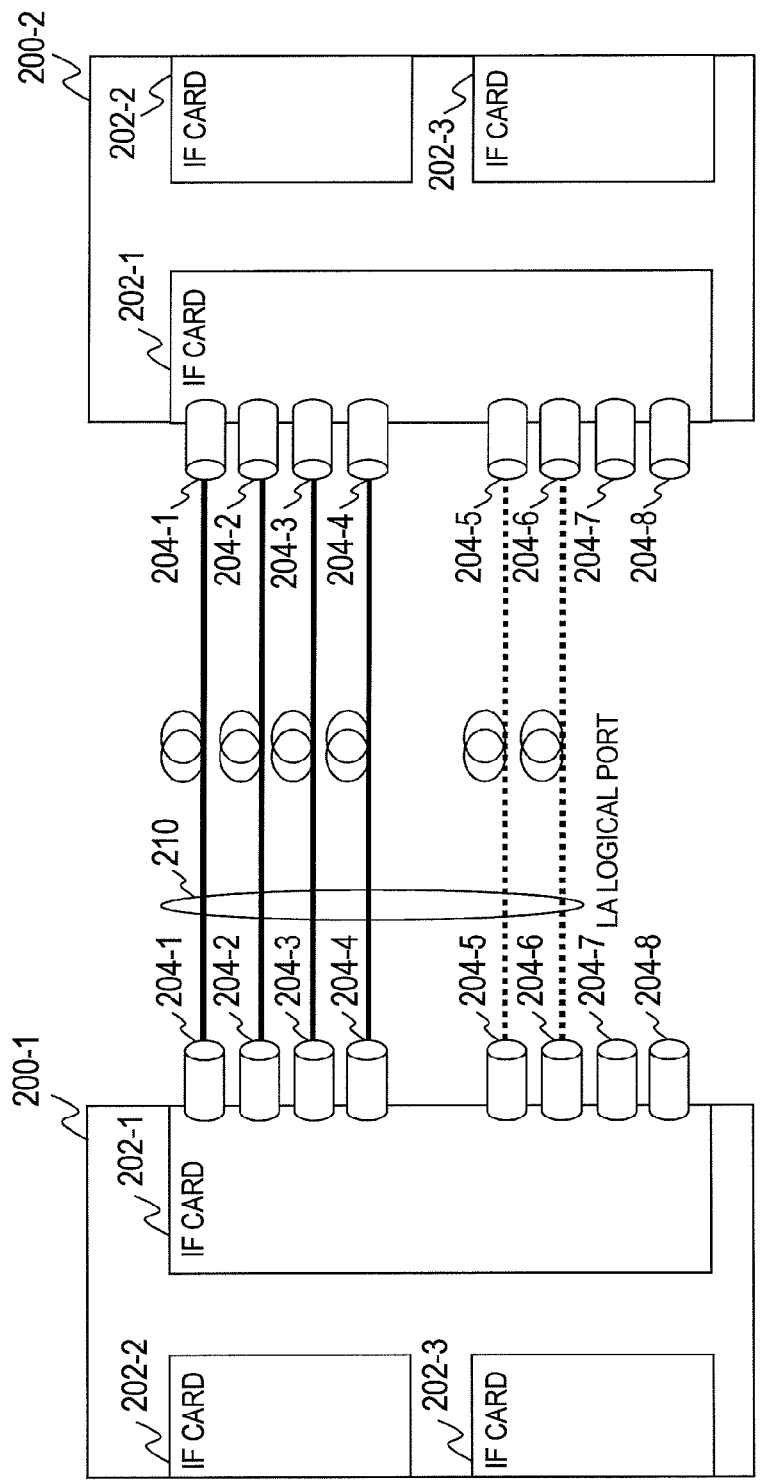
FIG. 2 is an explanatory diagram of a link aggregation.
Figure 3:
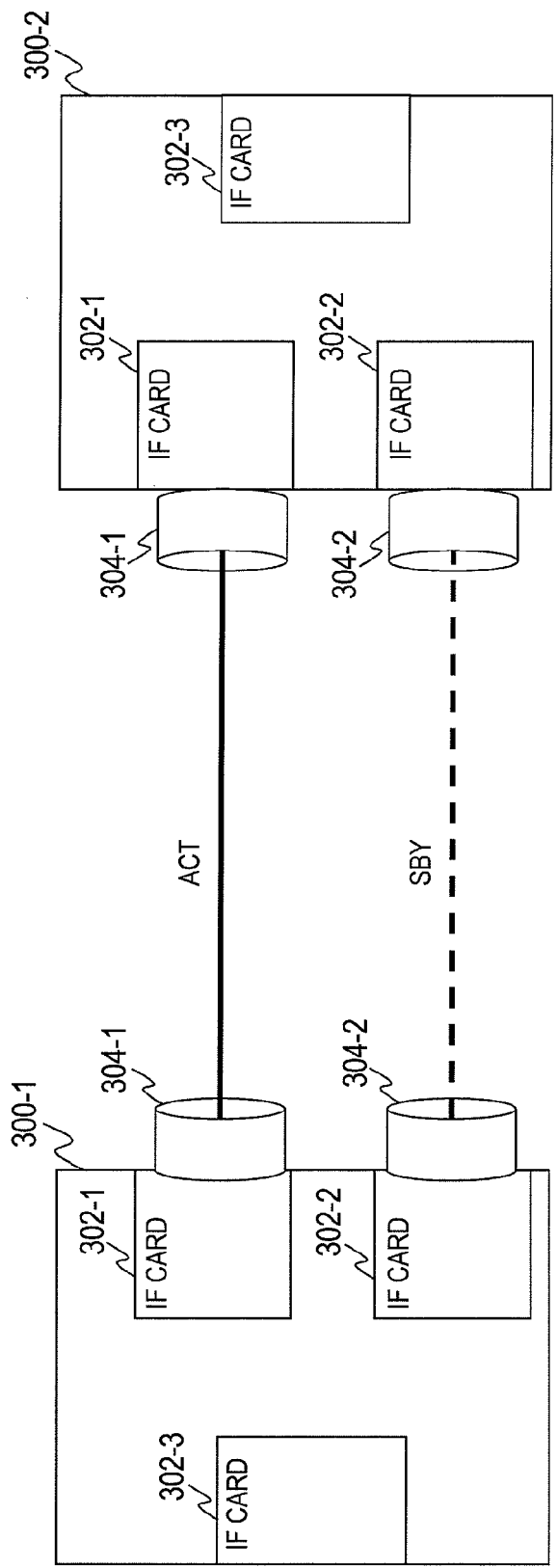
FIG. 3 is an explanatory diagram of an Ethernet protection switching.

A detailed description is now given of a first embodiment of this invention referring to the drawings. Though this embodiment employs the link aggregation as the function of aggregating a plurality of physical ports, the same effect is provided even when a method of aggregating a plurality of physical links other than the link aggregation is employed. Moreover, though this embodiment uses the Ethernet OAM for the failure monitoring of physical ports, even when a failure monitoring method other than the Ethernet OAM is employed, the same effect as in this embodiment is provided. Similarly, though this embodiment uses the Ethernet APS for switching the LA logical port, even when a redundant path switching method other than the Ethernet APS is employed, the same effect as in this embodiment is provided.

FIG. 1 is a block diagram illustrating a configuration of a communication system according to the first embodiment of this invention, and specifically illustrates an example of a communication system for building the link aggregation between communication devices, and configuring a communication path to be redundant.

The communication system according to this embodiment includes at least two communication devices 100-1 and 100-2, and an operation system (OpS) 130. In the following section, in a description common to both of the communication devices, the communication devices are sometimes generally referred to as communication devices 100-n. IF cards 102-1 to 102-4, physical ports 104-1 to 104-8, LA logical ports 110-1 to 110-2, and the like described later are sometimes similarly referred to as IF cards 102-n, physical ports 104-n, LA logical ports 110-n, and the like. The same applies to the other components (such as MAC processing circuit 106-n and the like described later). Moreover, the numbers of the illustrated components are examples, and this embodiment can be applied to a communication system including the components the numbers of which are different from the numbers illustrated in FIG. 1.

The communication device 100-n includes a control card 101, a plurality of interface (IF) cards 102-n, and a switch (SW) card 103.

The control card 101 has an interface function for coupling to an OpS 130 for setting the communication device 100-n and monitoring/controlling a state of the communication device 100-n, and is coupled to the OpS 130 via an OpS communication path 131. Moreover, the control card 101 has an interface function for communicating with the respective IF cards 102-n and the SW card 103. The control card 101 analyzes, when a monitoring/control command addressed to the communication device 100-n is transmitted from the OpS 130, the received command, and follows a command instruction from the OpS 130 to carry out various settings for the respective IF cards 102-n and the SW card 103, and to collect monitoring information from the IF cards 102-n and the SW card 103 to send the monitoring information to the OpS 130.

The SW card 103 has a function of coupling the respective IF cards 102-n to one another, identifying an output destination IF card 102-n from destination information on an Ethernet frame received from the IF card 102-n, and transferring the Ethernet frame to the output destination.

The IF card 102-n has a function of coupling the own device (namely the communication device 100-n including the IF card 102-n) to another communication device 100-n according to this invention and communication device not relating to this invention. The each IF card 102-n includes, as main components, a plurality of physical ports 104-n, a logical port switching circuit 111, and a physical port maintenance circuit 112. A description is later given of other components.

In FIG. 1, the communication devices 100-1 and 100-2 according to this embodiment are coupled to each other via eight physical ports 104-1 to 104-8. Further, the physical ports 104-1 to 104-4 belonging to the IF card 102-1 constitute one LA logical port 110-1 and the physical ports 104-5 to 104-8 belonging to the IF card 102-2 constitute another LA logical port 110-2.

In the example of FIG. 1, the LA logical port 110-1 is referred to as Working, the LA logical port 110-2 is referred to as Protection, the state of the LA logical port 110-1 is set to active (ACT) where communication is carried out, and the state of the LA logical port 110-2 is set to stand-by (SBY) used when the physical port 104-n belonging to the LA logical port 110-1 fails. These states are referred to as Working Act and Protection SBY.

It should be noted that "Working" and "Protection" represent types set in a fixed manner to each of the physical ports 104-n (and to, when a plurality of physical ports 104-n constitute an LA logical port 110-n, the LA logical port 110-n), and are not changed during the operation. In contrast, "ACT" and "SBY" represent states of each of the LA logical ports 110-n, and are changed depending on an occurrence of and a recovery from a failure on the physical port 104-n. As described later, when any one of the physical ports 104-n is not failed, the communication system is operated in the states of Working ACT and Protection SBY, and after the physical port 104-n included in the LA logical port 110-n on the Working side fails until the physical port 104-n recovers from the failure, the LA logical port 110-n on the Protection side is in the ACT state. Moreover, a frame for instructing the switching between ACT and SBY is communicated via the physical port 104-n on the Protection side between the communication devices 100-n.

In this embodiment, the Ethernet frame is transferred by using only the LA logical port on the ACT side, and the Ethernet frame is not transferred on the LA logical port on the SBY side. This is referred to as 1:1 redundancy. In the following section, in this embodiment, a description is given of a case, as an example, where the redundancy is provided by the LA logical port 110-1 of the IF card 102-1 and the LA logical port 110-2 of the IF card 102-2.

Figure 5:
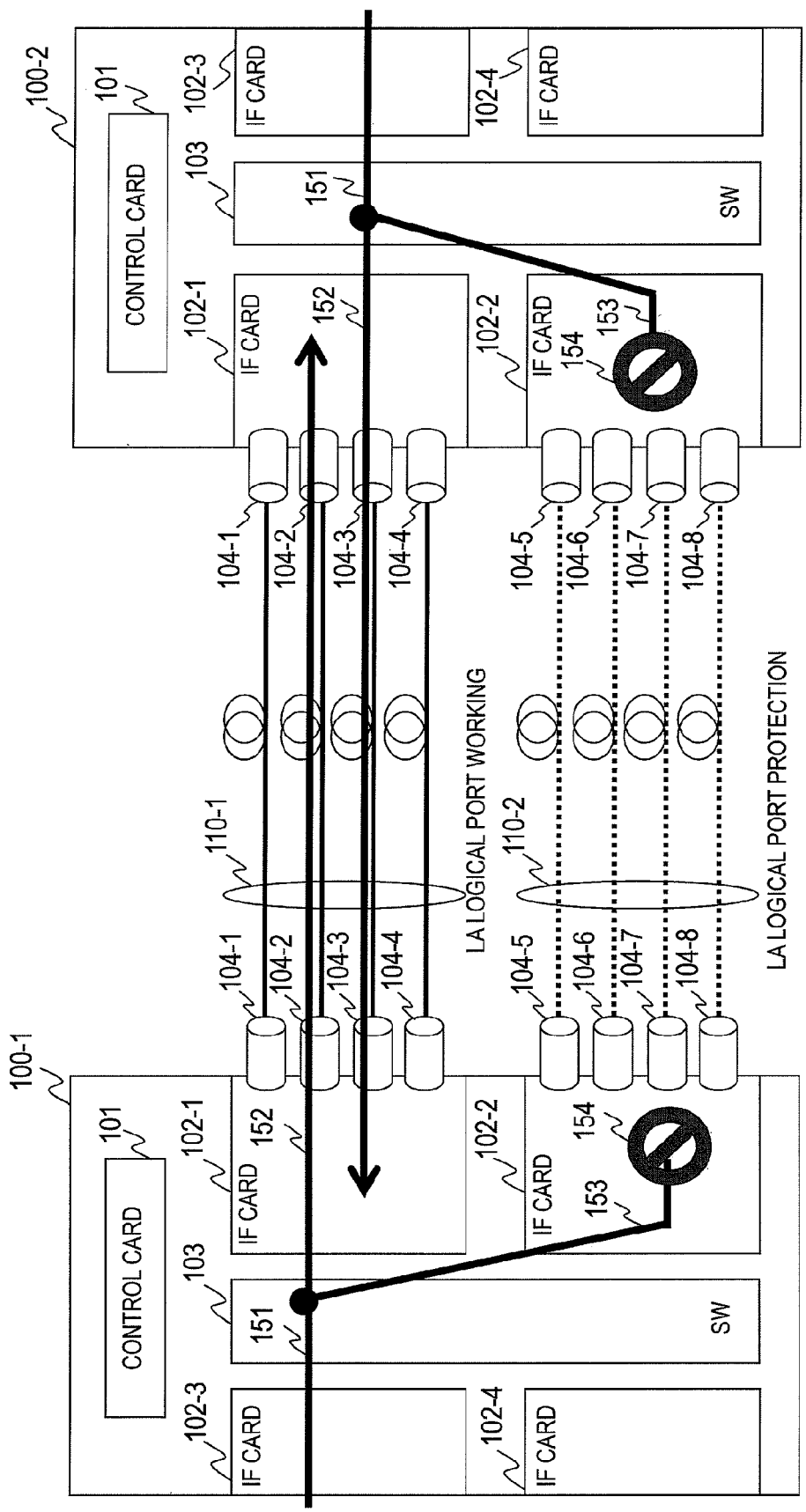
FIG. 5 is an explanatory diagram of flows of Ethernet frames in the communication system according to the first embodiment of this invention.

FIG. 5 is an explanatory diagram of flows of the Ethernet frames in the communication system according to the first embodiment of this invention.

The IF cards 102-3 and 102-4 of the communication devices 100-1 and 100-2 are coupled to other devices (in other words, communication devices other than the communication devices 100-1 and 100-2) (not shown). The communication device 100-1 first transfers an Ethernet frame received from another device (not shown) to the SW card 103 (151). The SW card 103 duplicates the received Ethernet frame when a destination of the received Ethernet frame is the LA logical ports 110-1 and 110-2, which are configured to be redundant, and transfers the Ethernet frames to the IF cards 102-1 and 102-2 to which the LA logical ports 110-1 and 110-2 belong.

The Ethernet frame transferred to the IF card 102-1 to which the LA logical port 110-1 in the ACT state belongs is transferred via any one of the physical ports 104-1 to 104-4 constituting the LA logical port 110-1 to the communication device 100-2 (152).

On the other hand, the Ethernet frame transferred to the IF card 102-2 to which the LA logical port 110-2 in the SBY state belongs is discarded in the IF card 102-2 (153 and 154).

In the example of FIG. 5, the Ethernet frame addressed to the IF card to which the LA logical port in the SBY state belongs is discarded in the IF card 102-2 to which the LA logical port in the SBY state belongs. However, when the SW card 103 holds attribute information on the LA logical ports 110-n and the IF cards 102-n and ACT/SBY information (namely information representing whether the LA logical ports 110-n are in the ACT state or the SBY state), and always transfers the Ethernet frames only to the IF card to which the LA logical port in the ACT state belongs, the same effect as described above can be provided. As described later, in this case, the ACT/SBY information on the LA logical port 110-n is notified from the IF card 102-n to the SW card 103.

Figure 4:
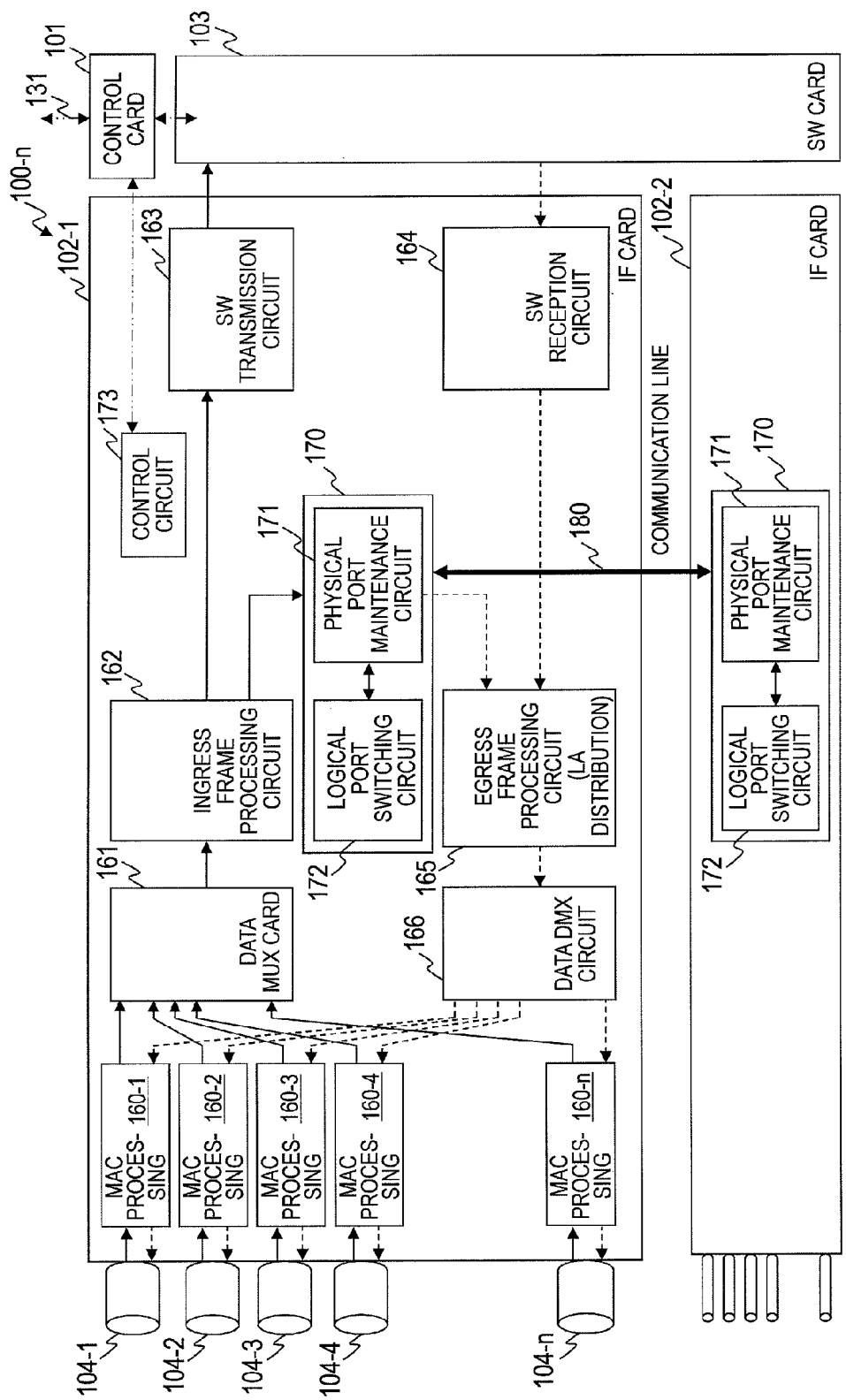
FIG. 4 is a functional block diagram of an interface card included in a communication device according to the first embodiment of this invention.

Referring to FIG. 4, a description is now given of an arrangement of functional blocks in the IF card 102-n of the communication device 100 to realize the redundancy of the LA logical port as described above.

FIG. 4 is a functional block diagram of the interface card 102-n included in the communication device 100 according to the first embodiment of this invention.

As also illustrated in FIG. 1, the communication device 100 is constituted by the control card 101, the plurality of IF cards 102-n, and the SW card 103.

The IF card 102-n is constituted by the plurality of physical ports 104-n, a plurality of media access control (MAC) processing circuits 160-n, a data multiplexer (MUX) circuit 161, an ingress frame processing circuit 162, a SW transmission circuit 163, a SW reception circuit 164, an egress frame processing circuit 165, a data multiplexer (DMX) circuit 166, a maintenance switching circuit unit 170, and a control circuit 173. Moreover, the maintenance switching circuit unit 170 of the IF card 102-n is coupled, via a communication line 180, to the maintenance switching circuit unit 170 of another IF card 102-n (such as the IF card 102-2) combined with the interface card 102-n (such as the IF card 102-1) to configure the LA logical port to be redundant, and exchanges, via the communication line 180, a state of the IF card. The communication line 180 is a communication line used to mutually communicate a switching request command described later and the like between the IF cards 102-*n*, and may be any type of a communication line.

It should be noted that FIG. 4 illustrates components of the IF card 102-1. Components of the IF card 102-2 are the same as those of the IF card 102-1 as an example, and portions other than the maintenance switching circuit unit 170 are not illustrated.

A description is now given of the respective components (functional blocks) of the IF card 102-*n*.

The control circuit 173 has a function of setting values to the respective functional blocks depending on the communication to/from the control cards 101 and commands from the control card 101, and a function of reading states of the respective functional blocks, and notifying the control card 101 of the read states.

The physical port 104-*n* is an IF for coupling to a neighboring communication device.

The MAC processing circuit 160-*n* has a reception function and a transmission function for data. For example, the MAC processing circuit 160-*n* has a function, as the reception function, of terminating a communication signal in a form used on the physical port 104-*n*, identifying an Ethernet frame from a received communication signal, and checking normality of the Ethernet frame as a unit, and a function, as the transmission function, of converting an Ethernet frame received from the data DMX circuit 166 into a communication signal in the form used on the physical port 104-*n*, and transmitting the communication signal to the physical port 104-*n*.

The data MUX circuit 161 multiplexes Ethernet frames received from the respective MAC processing circuits 160-*n*, and converts a speed of the multiplexed frame to meet a processing speed in the IF card 102-*n*. Moreover, the data MUX circuit 161 generates an internal header 411, and adds a physical port ID of a physical port 104 which has received the frame to a port ID field 414.

The ingress frame processing circuit 162 identifies whether a received Ethernet frame is an Ethernet frame (user frame) used by a network user for data communication, or an OAM frame or an APS frame, and transfers the received Ethernet frame, when the Ethernet frame is a user frame, to the SW transmission circuit 163, and, when the Ethernet frame is an OAM frame or an APS frame, to the physical port maintenance circuit 171.

The SW transmission circuit 163 transmits a received Ethernet frame to the SW card 103.

Figure 7:
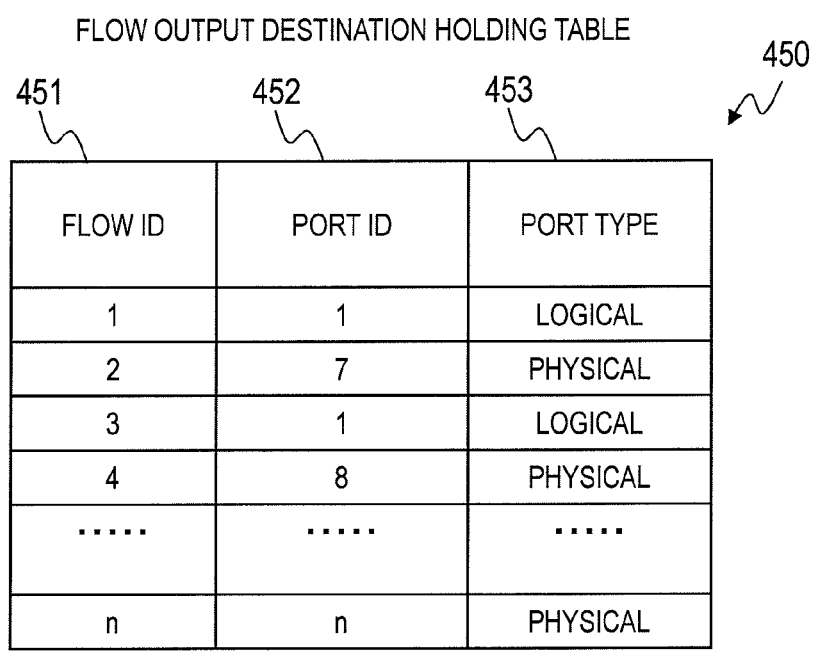
FIG. 7 is an explanatory diagram of a flow output destination holding table held by the communication device according to the first embodiment of this invention.
Figure 8:
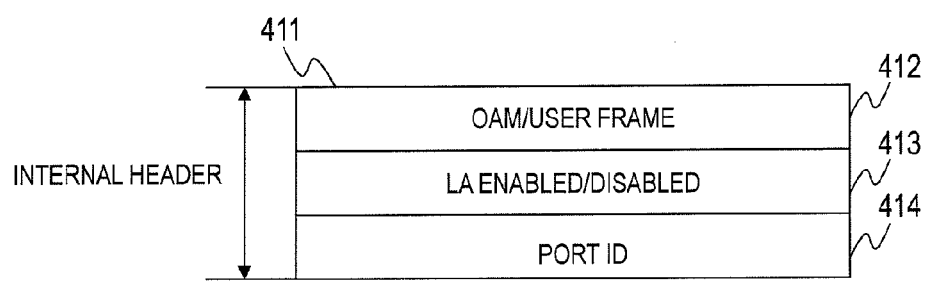
FIG. 8 is an explanatory diagram of a format of an internal header added by the communication device according to the first embodiment of this invention.

Referring to FIGS. 7 and 8, a description is given of a detailed operation of the SW reception circuit 164. An Ethernet frame transmitted from the SW card 103 to the IF card 102-*n* is received by the SW reception circuit 164, and a flow is identified from the destination information thereon. For the identification of the flow, the MAC address, the VID, the LSP ID of the MPLS, the IP address, and the like may be used. When the flow is identified, the SW reception circuit 164 then refers to a flow output destination holding table 450 shown in FIG. 7 to identify an output destination port of the received Ethernet frame.

FIG. 7 is an explanatory diagram of the flow output destination holding table 450 held by the communication device 100-*n* according to the first embodiment of this invention.

The flow output destination holding table 450 is held in the SW reception circuit 164, for example, and is constituted by flow IDs 451, port IDs 452, and port types 453. The flow ID is information for identifying a flow (ID such as a flow number), and the port ID 452 is information for identifying a physical port 104-*n* or an LA logical port 110-*n* (ID such as a port number). The port type 453 is information for specifying whether the port identified by the port ID 452 is a physical port 104-*n* or an LA logical port 110-*n*.

The SW reception circuit 164 searches the flow output destination holding table 450 after a flow of a received Ethernet frame is identified, by using a flow number (flow ID) of the identified flow as a search key. Specifically, the SW reception circuit 164 searches for an flow ID 451 in the flow output destination holding table 450 matching the flow ID of the identified flow, and acquires a port ID 452 and a port type 453 corresponding to the flow ID 451. Further, the SW reception circuit 164 generates an internal header 411, and adds the generated internal header 411 to a header of the received Ethernet frame.

FIG. 8 is an explanatory diagram of a format of the internal header 411 added by the communication device 100-*n* according to the first embodiment of this invention.

The internal header 411 is constituted by an OAM/user frame identification field 412, an LA enabled/disabled field 413, and a port ID field 414.

The SW reception circuit 164 writes, to the OAM/user frame identification field 412 of the internal header 411 of a received Ethernet frame, information for identifying whether or not the Ethernet frame is a user frame. Then, the SW reception circuit 164 sets a value of the port type 453 acquired from the flow output destination holding table 450 to the LA enabled/disabled field 413 of the internal header 411. Further, the SW reception circuit 164 sets a value of the port ID 452 acquired from the flow output destination holding table 450 to the port ID field 414 of the internal header 411.

When the above-mentioned processing has been completed, the SW reception circuit 164 transfers the received Ethernet frame to the egress frame processing circuit 165.

The maintenance switching circuit unit 170 is constituted by a physical port maintenance circuit 171 and a logical port switching circuit 172. The physical port maintenance circuit 171 and the logical port switching circuit 172 correspond respectively to the physical port maintenance circuit 112 and the logical port switching circuit 111 of FIG. 1. The maintenance switching circuit unit 170 generates an OAM frame or an APS frame, adds an internal header 411 to a header of the generated frame, and transfers the frame to the egress frame processing circuit 165.

A description is now given of the values set to the internal header 411 generated by the maintenance switching circuit unit 170. The maintenance switching circuit unit 170 sets, to the OAM/user frame identification field 412 of the internal header 411, information representing that a generated Ethernet frame is an OAM frame (including an OAM frame and an APS frame). Then, the maintenance switching circuit unit 170 sets the LA enabled/disabled field 413 to "disabled". As described later, by setting this field to disabled, the OAM frame can be output from a physical port 104-*n* specified by the maintenance switching circuit unit 170. The maintenance switching circuit unit 170 sets, to the port ID field 414, an output destination physical port ID of the frame.

Figure 6:
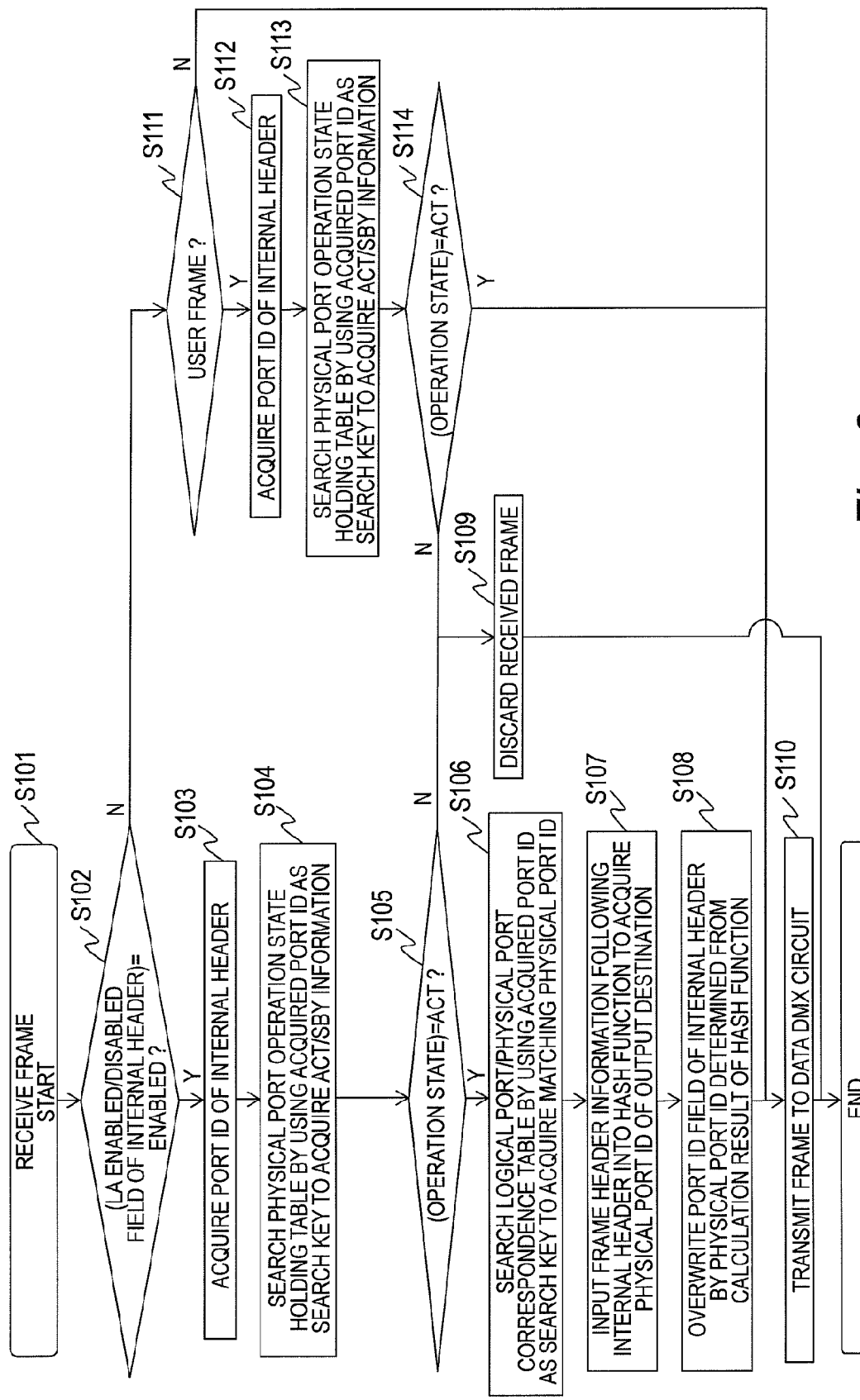
FIG. 6 is a processing flowchart of an egress frame processing circuit according to the first embodiment of this invention.
Figure 9:
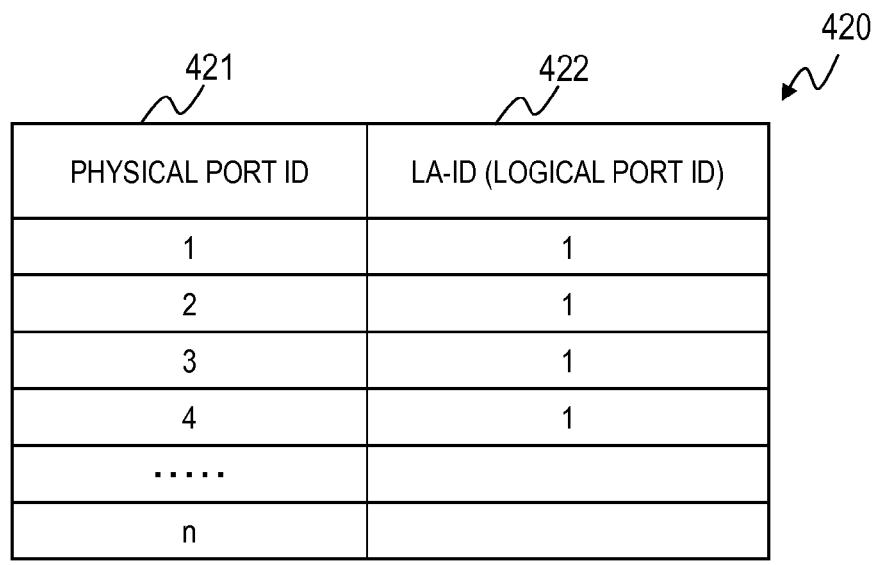
FIG. 9 is an explanatory diagram of a logical port/physical port correspondence table held by the communication device according to the first embodiment of this invention.

The egress frame processing circuit 165 includes a logical port/physical port correspondence table 420 and a logical port operation state holding table 430. Referring to FIGS. 6, 9, and 10, a description is given of a detailed operation of the egress frame processing circuit 165.

FIG. 6 is a processing flowchart of the egress frame processing circuit 165 according to the first embodiment of this invention.

When the egress frame processing circuit 165 receives an Ethernet frame, the egress frame processing circuit 165 starts processing (S101).

When the egress frame processing circuit 165 receives the Ethernet frame, the egress frame processing circuit 165 first analyzes the internal header 411 of the received Ethernet frame to check whether the value of the LA enabled/disabled field 413 of the internal header 411 is "enabled" or "disabled" (S102).

When the value of the LA enabled/disabled field 413 is "enabled", the egress frame processing circuit 165 then acquires the port ID field 414 from the internal header 411 (S103). The value of the LA enabled/disabled field 413 is "enabled", and an ID of an LA logical port is thus set to the port ID field 414 of the internal header 411, instead of an ID of a physical port.

Then, the egress frame processing circuit 165 searches, by using the acquired ID of the LA logical port as a search key, the logical port operation state holding table 430 (S104).

FIG. 10 is an explanatory diagram of the logical port operation state holding table 430 held by the communication device 100-$n$ according to the first embodiment of this invention.

The logical port operation state holding table 430 includes a logical port ID field 431 and an operation state field 432. The table holds information representing whether an LA logical port 110-$n$ configured to be redundant is currently used as ACT or SBY. Specifically, the logical port ID field 431 holds information (such as a port number) for identifying each LA logical port 110-$n$, and the operation state field 432 holds information for representing whether the each LA logical port 110-$n$ is in the ACT state or the SBY state.

Then, the egress frame processing circuit 165 determines whether the operation state acquired from the logical port operation state holding table 430 is ACT or SBY (S105).

When the operation state acquired from the logical port operation state holding table 430 is SBY, the frame output is inhibited from an SBY port set to the 1:1 protection, and the egress frame processing circuit 165 discards the received frame (S109).

An effect of the frame discard processing in S109 can restrain a frame addressed to an LA logical port in the SBY state from being output from the IF card when the 1:1 redundancy is set.

When the operation state acquired from the logical port operation state holding table 430 is ACT, the egress frame processing circuit 165 determines a physical port 104-$n$ for outputting the received frame. First, the egress frame processing circuit 165 considers the value of the port ID field 414 acquired from the internal header 411 as an LA ID, searches the logical port/physical port correspondence table 420, and acquires IDs of all physical ports belonging to an LA logical port identified by the LA ID (S106).

FIG. 9 is an explanatory diagram of the logical port/physical port correspondence table 420 held by the communication device 100-$n$ according to the first embodiment of this invention.

The logical port/physical port correspondence table 420 includes a physical port ID 421 for identifying each of the physical ports 104-$n$, and an LA ID 422 for identifying a logical port to which each of the physical ports 104-$n$ belongs. By referring to the table, a physical port ID belonging to an LA logical port can be acquired. For example, when a received frame is addressed to an LA logical port, and the port ID field 414 is "1", the egress frame processing circuit 165 considers (port ID)=1 as (LA ID)=1, and searches the logical port/physical port correspondence table 420 by using (LA ID)=1 as a key. In the example illustrated in FIG. 9, values of physical port IDs belonging to the LA logical port identified by (LA ID)=1 can be identified as 1, 2, 3, and 4.

Then, the egress frame processing circuit 165 collects, from the Ethernet frame following the internal header 411, address information such as the MAC address, the VID, the LSP ID of the MPLS, and the IP address, inputs these pieces of header information as a hash key into a hash function circuit (not shown), and determines an output destination physical port ID (S107).

On this occasion, the hash function circuit is an arithmetic operation circuit which receives an input of a hash key to a certain function and outputs a hash value as a calculation result, and belongs to the egress frame processing circuit 165. For example, when the hash key is input to a hash function circuit providing four types of the hash calculation result, a hash value taking any one of 1 to 4 is acquired as the output.

For example, when the physical port 104-1 is associated with a hash value 1; 104-2, 2; 104-3, 3; and 104-4, 4, a physical port 104-$n$ from which the Ethernet frame is to be output can be determined based on the hash value acquired from the address information in the received Ethernet frame.

The hash function used by the hash function circuit is preferably used selectively depending on the number of physical ports belonging to the LA logical port. For example, when the number of the physical ports is three, a hash function having three types of hash values: 1, 2, and 3 is used.

Then, the egress frame processing circuit 165 overwrites the value in the port ID field 414 of the internal header 411 by the physical port ID determined by the calculation result of the hash function (S108). As a result, the output destination physical port of the Ethernet frame is determined.

Then, the egress frame processing circuit 165 transfers the Ethernet frame to the data DMX circuit 166 (S110).

When the link aggregation is applied, the above-mentioned processing determines from which physical port 104-$n$ constituting the LA logical port 110-$n$ the Ethernet frame is to be output. Therefore, usually, a specific Ethernet frame cannot be output from a specific physical port 104-$n$ constituting the intended LA logical port 110-$n$ by setting from the OpS 130 or the like.

A description is now given of processing when the determination logic in S102 determines that the value of the LA enabled/disabled field 413 of the internal header 411 is "disabled." As already described above, the LA enabled/disabled field 413 of the OAM frame is set by the maintenance switching circuit unit 170 to "disabled", and when the received frame is an OAM frame, in S102, the value is always determined as "disabled".

The egress frame processing circuit 165 acquires a value of the OAM/user frame field 412 of the internal header 411 to determine whether or not the received Ethernet frame is a user frame (S111).

As a result of the determination in S111, when the received Ethernet frame is an OAM frame, the egress frame processing circuit 165 transfers the received Ethernet frame to the data DMX circuit 166 (S110).

In this way, when the received Ethernet frame is an OAM frame, the egress frame processing circuit 165 can transfer the frame received from the maintenance switching circuit unit 170 to the data DMX circuit 166 without changing the internal header and the like, and discarding the frame. Therefore, the OAM frame is to be transmitted from the physical port 104-$n$ specified by the maintenance switching circuit unit 170, regardless of whether the link aggregation is enabled/disabled or the operation state of the redundancy setting port is ACT or SBY.

As a result of the determination in S111, when the received Ethernet frame is a user frame, the egress frame processing circuit 165 acquires the port ID field 414 from the internal header 411 (S112).

Then, the egress frame processing circuit 165 searches, by using the acquired port ID as a search key, the physical port operation state holding table (not shown) (S113). The physical port operation state holding table is constituted by a physical port ID field and an operation state field. In other words, the physical port operation state holding table corresponds to a table acquired by replacing the logical port ID field 431 of the logical port operation state holding table 430 (FIG. 10) by the physical port ID field. The table holds information representing whether each physical port 104-$n$ used for the redundancy is currently used as ACT or SBY.

Then, the egress frame processing circuit 165 determines whether the operation state of the physical port 104-$n$ acquired from the physical port operation state holding table is ACT or SBY (S114).

When the operation state acquired from the table is ACT, the egress frame processing circuit 165 transfers the received frame to the data DMX circuit (S110).

When the operation state acquired from the table is SBY, the frame output from an SBY port set to the 1:1 protection is inhibited, and the egress frame processing circuit 165 discards the received frame (S109).

An effect of the frame discard processing in S109 can restrain a frame addressed to a physical port in the SBY state from being output from the IF card when the 1:1 redundancy is set.

The data DMX circuit 166 acquires the port ID field 414 of the internal header 411 of the frame transferred from the egress frame processing circuit 165, and transfers the frame to the MAC processing circuit 160-$n$ to which a physical port 104-$n$ corresponding to the acquired port ID is coupled.

Referring to FIG. 11, a description is now given of a detailed operation of the maintenance switching circuit unit 170. The maintenance switching circuit unit is constituted by a physical port maintenance circuit 171, a logical port switching circuit 172, and a physical port management table 440.

FIG. 11 is an explanatory diagram of the physical port management table 440 held by the communication device 100-$n$ according to the first embodiment of this invention.

The physical port management table 440 is a table referred to by both the physical port maintenance circuit 171 and the logical port switching circuit 172, and is constituted by physical port IDs 441, link layer OAMs 442, link layer statuses 443, LA IDs 444, LA settings 445, and link names 446.

The physical port ID 441 is information (ID) for identifying each of the physical ports 104-$n$ in each IF card 102-$n$. The link layer OAM 442 is information for representing whether or not the each physical port 104-$n$ transmits/receives a continuity check (CC) frame of the Ethernet OAM, and "enabled" represents that the physical port 104-$n$ checks, by transmitting/receiving the CC frame, whether or not the physical link passing through the physical port 104-$n$ is normal. The state 443 represents whether the state of the link checked by transmitting/receiving the CC frame is "normal" or "failed".

The LA ID 444 is information (ID) for identifying an LA logical port 110-$n$ to which the each physical port 104-$n$ belongs. The LA setting 445 is information representing whether or not the each physical port 104-$n$ is used for the link aggregation, and "enabled" represents that the physical port 104-$n$ is used for the link aggregation. The link name 446 is a name of a physical link which passes through the each physical port 104-$n$, or, when the physical port 104-$n$ belongs to an LA logical port 110-$n$, a name of a logical link passing through the LA logical port 110-$n$, and is, in the example of FIG. 1, "Working", "Protection", and the like.

FIG. 11 shows, as an example, the physical port management table 440 held by the IF card 102-1 of the communication devices 100-1 and 100-2. To the link names 446 of the physical port management table 440 of the IF card 102-1, the name, Working is set. On the other hand, Protection is set to the link names 446 having values 1 to 4 in the physical port ID 441 in the physical port management table 440 of the IF card 102-2 (namely, the IF card 102-2 having the physical ports 104-$n$ used in place of the physical ports 104-$n$ of the IF card 102-1 when the physical ports 104-$n$ fail) for serving to be redundant with the IF card 102-1, which is not shown in FIG. 11.

The names, Working and Protection, determine the IF card which transmits an APS frame when a failure occurs. Specifically, the APS frame is transmitted/received by the physical port 104-$n$ on the Protection side as illustrated in FIGS. 12 to 15.

The communication device 100-$n$ (such as the communication device 100-1) can use the continuity check (CC) frame of the Ethernet OAM in order to check normality of the physical link coupling to the opposite communication device 100-$n$ (such as communication device 100-2).

The communication device 100-$n$ periodically transmits/receives the CC frame, and determines that the physical link is normally operating when the communication device 100-$n$ receives the CC frame from the opposite device. Moreover, when the communication device 100-$n$ has not received the CC frame for a certain time period or longer, the communication device 100-$n$ determines that a failure occurs on the physical link. The physical port maintenance circuit 171 is a functional block for carrying out the series of the normality check processing.

Processing by the physical port maintenance circuit 171 is roughly divided into two parts, which are OAM frame transmission processing and OAM frame reception processing.

A description is first given of the OAM frame transmission processing by the physical port maintenance circuit 171.

The physical port maintenance circuit 171 periodically polls the physical port management table 440, and generates a CC frame for each of physical port IDs enabled for the link layer OAM.

When the physical port maintenance circuit 171 generates the CC frame, the physical port maintenance circuit 171 adds an internal header 411 to a header of the CC frame, and transfers the CC frame to the egress frame processing circuit 165.

To the OAM/user frame identification field 412 of the internal header 411 added to the CC frame, information representing that the CC frame is an OAM frame is set. To the LA enabled/disabled field 413, "disabled" is set, and, to the port ID field 414, the physical port ID 441 acquired from the physical port management table 440 is set. In this way, by generating the internal header 411 having the LA enabled/disabled field 413 set to "disabled", as described for the processing in S110 of FIG. 6, the OAM frame is not discarded in the egress frame processing circuit 165, but is output from the specified physical port 104-$n$. Thus, by using this embodiment, the CC frame can be transmitted to each of the physical ports 104-$n$ belonging to the LA logical port 110-$n$.

A description is next given of the OAM frame reception processing by the physical port maintenance circuit 171.

When the physical port maintenance circuit 171 receives the CC frame, the physical port maintenance circuit 171 analyzes from which physical port 104-$n$ the CC frame is received. When the CC frame is received from the physical port 104-$n$ set to the physical port management table 440, the physical port maintenance circuit 171 determines that the CC frame is received normally, and sets the status 443 corresponding to the physical port 104-$n$ to "normal."

When a normal CC frame cannot be received at a physical port 104-$n$ having the link layer OAM 442 set to "enabled" for a certain time period or longer, the physical port maintenance circuit 171 rewrites the status 443 corresponding to the physical port 104-$n$ to "failed".

The physical port 104-$n$ having the status 443 rewritten to "failed" is determined not to normally carry out the data communication.

When the physical port maintenance circuit 171 has received a normal CC frame from the physical port 104-$n$ determined as "failed" predetermined n successive times, the physical port maintenance circuit 171 determines that the data communication has recovered, and rewrites the status 443 corresponding to the physical port 104-$n$ to "normal".

In this embodiment, by monitoring the periodic reception of the CC frame in this way, it can be confirmed that the physical port 104-$n$ belonging to the LA logical port 110-$n$ is not failed.

A description is now given of the logical port switching circuit 172.

The logical port switching circuit 172 periodically polls the physical port management table 440 to monitor information on the statuses 443.

For example, when the logical port switching circuit 172 of the IF card 102-1 of the communication device 100-1 detects a physical port ID which has changed in the corresponding status 443 from "normal" to "failed", the logical port switching circuit 172 notifies the IF card 102-2 of the occurrence of the failure and an instruction of switching by using the communication line 180, the IF card 102-2 configuring the LA logical port 110-$n$ to be redundant along with the IF card 102-1.

Figure 12:
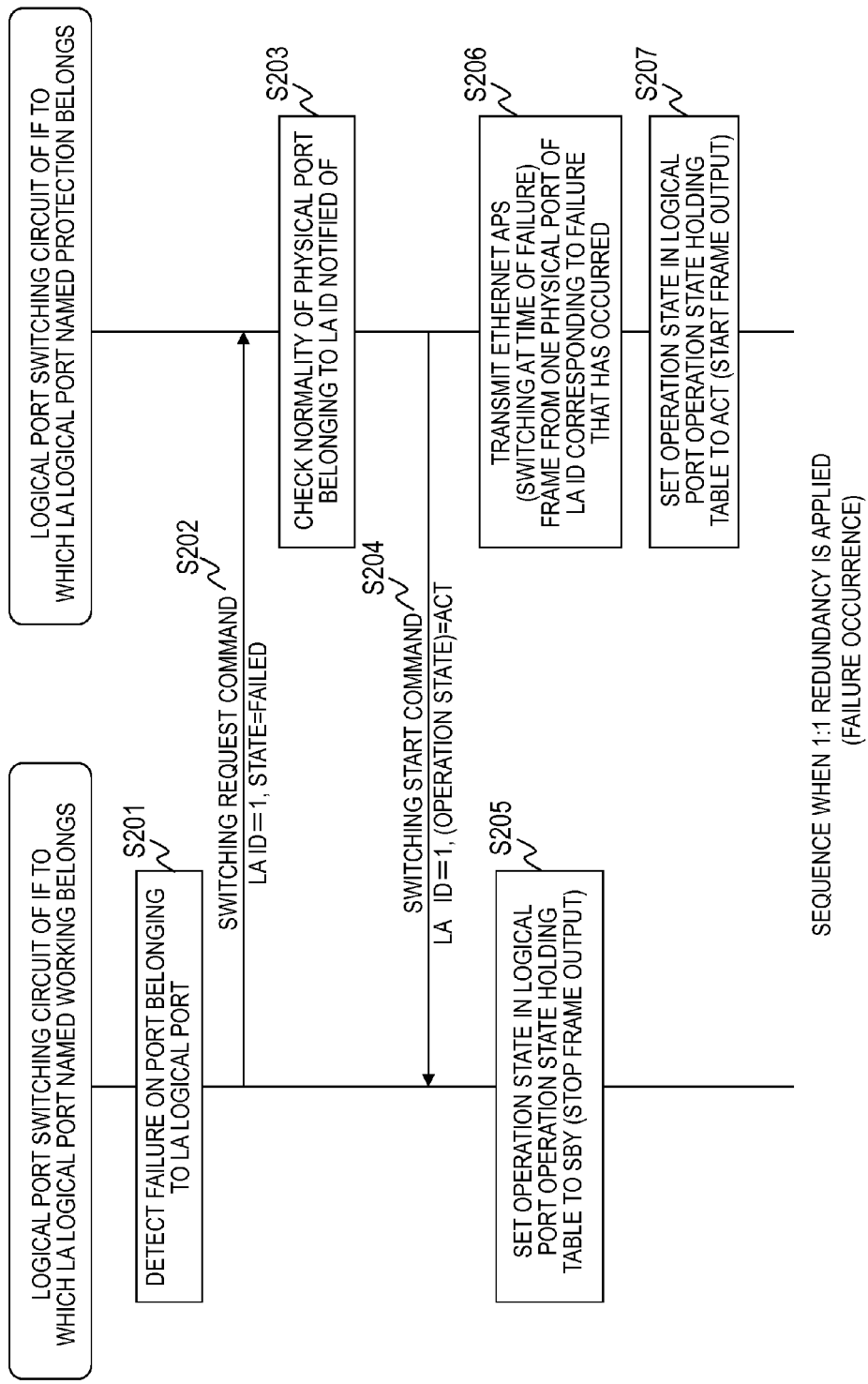
FIG. 12 is a sequence diagram of the processing of switching an LA logical port by a logical port switching circuit which has detected a failure of a physical port according to the first embodiment of this invention.

As an example, referring to FIG. 12, a description is given of processing operation carried out by the logical port switching circuit 172 when the physical port 104-2 constituting the LA logical port 110-1 belonging to the IF card 102-1 of the communication device 100-1 fails.

FIG. 12 is a sequence diagram of the processing of switching the LA logical port 110-$n$ by the logical port switching circuit 172 which has detected a failure of a physical port 104-$n$ according to the first embodiment of this invention.

The logical port switching circuit 172 detects, when the logical port switching circuit 172 polls an entry having 2 in the physical port ID 441 in the physical port management table 440, a change in the status 443 from normal to failed.

The logical port switching circuit 172 acquires the LA ID 444, the LA setting 445, and the link name 446 (in the example of FIG. 11, respectively "1", "ENABLED", and "Working") of the entry having 2 in the physical port ID 441.

Then, the logical port switching circuit 172 confirms that the acquired LA setting 445 is "enabled", and searches the logical port operation state holding table 430 by using the value of the LA ID 444 (in the above-mentioned example, a value "1" of the LA ID of the LA logical port 110-1) acquired from the physical port management table 440 as a search key.

When the operation state field 432 of the entry in the table acquired by the search is "ACT", the data communication is carried out currently by using the LA logical port 110-1. Therefore, the logical port switching circuit 172 determines that a problem is occurring in the data communication at the LA logical port 110-1 to which the physical port ID having the detected failure belongs (S201).

The logical port switching circuit 172 of the IF card 102-1 uses the communication line 180 to notify the logical port switching circuit 172 of the IF card 102-2, as the switching request command, of (LA ID)=1 and the state "failed" (S202).

When the logical port switching circuit 172 of the IF card 102-2 detects the switching request command, the logical port switching circuit 172 checks the normality of the physical port 104-$n$ (hereinafter also referred to as the physical port 104-$n$ corresponding to the LA ID) belonging to the LA logical port 110-$n$ identified by the notified LA ID (S203). The following description shows such an example that, to each of the LA logical ports 110-$n$, an LA ID unique in the IF card 102-$n$ is assigned, and, to the LA logical port 110-1 belonging to the IF card 102-1 on the Working side and the LA logical port 110-2 that belongs to the IF card 102-2 on the Protection side and is paired therewith (namely redundant therewith), the same LA ID "1" is assigned. In this case, in S203, the normality of the physical ports 104-5 to 104-8 belonging to the LA logical port 110-2 on the Protection side is checked. For example, by searching the physical port management table 440 by using the LA ID as a search key, and checking the status 443 of a physical port ID corresponding to the retrieved LA ID, the normality of the physical port 104-$n$ corresponding to the retrieved LA ID can be checked.

Though different LA IDs may be assigned to the LA logical ports 110-1 on the Working side and the LA logical ports 110-1 on the Protection side which are paired, in this case, LA IDs defined by a predetermined rule need to be assigned, or information associating the LA IDs of the paired two LA logical ports 110-$n$ needs to be held by the IF card 102-$n$. In this case, in S203, search is carried out by using an LA ID corresponding to the notified LA ID as a search key.

When the logical port switching circuit 172 of the IF card 102-2 confirms that the physical port 104-$n$ corresponding to the notified LA ID is normal, the logical port switching circuit 172 of the IF card 102-2 transmits, as a switching start command, (LA ID)=1 and (operation state)=ACT to the logical port switching circuit 172 of the IF card 102-1 (S204).

The logical port switching circuit 172 of the IF card 102-2 transmits, after the transmission of the switching start command, an APS frame from one of the physical ports 104-$n$ belonging to the LA logical port 110-$n$ identified by the LA ID (in the above-mentioned example, one of the physical ports 104-5 to 104-8 belonging to the LA logical port 110-2 identified by (LA ID)=1), to notify the opposite communication device 100-2 of the occurrence of the failure on the Working side (S206). Though any physical port 104-$n$ corresponding to the LA ID may transmit the APS frame, the APS frame may be transmitted from a physical port having the smallest ID (in the above-mentioned example, out of the physical ports 104-5 to 104-8, the physical port 104-5 having the smallest ID).

The APS frame is generated by the logical port switching circuit 172. The logical port switching circuit 172 adds the internal header 411 to the generated APS frame, and transfers the APS frame to the egress frame processing circuit 165.

To the OAM/user frame identification field 412 of the internal header 411, information representing that the APS frame is an OAM frame is set. To the LA enabled/disabled field 413, "disabled" is set, and, to the port ID field 414, for example, the smallest physical port ID belonging to the LA logical port 110-$n$ is set. In this way, by generating the internal header while the LA enabled/disabled field 413 is set to "disabled", the OAM frame is output without being discarded by the egress frame processing circuit 165, from the physical port as specified. In this way, according to this embodiment, the APS frame can be transmitted from any physical port 104-*n* belonging to the LA logical port 110-*n* (such as the physical port 104-5 belonging to the LA logical port 110-2).

Then, the logical port switching circuit 172 of the IF card 102-2 searches the logical port operation state holding table 430 by using the LA ID (in the above-mentioned example, "1") as a search key, and changes the operation state 432 of a corresponding entry from SBY to ACT (S207). A user frame transmitted to the LA logical port 110-1 having (LA ID)=1 has been discarded by the IF card 102-2 having the LA logical port 110-2, but, as a result of the change of the operation state 432 as described above, the user frame is not discarded by the IF card 102-2 but is transferred.

When the logical port switching circuit 172 of the IF card 102-1 receives the switching start command (S204), the logical port switching circuit 172 searches the logical port operation state holding table 430 by using the LA ID (in the above-mentioned example, "1") as a search key, and changes the operation state 432 of a corresponding entry from ACT to SBY (S205). As a result, the user frame addressed to the LA logical port having (LA ID)=1 is discarded by the IF card 102-1.

Figure 13:
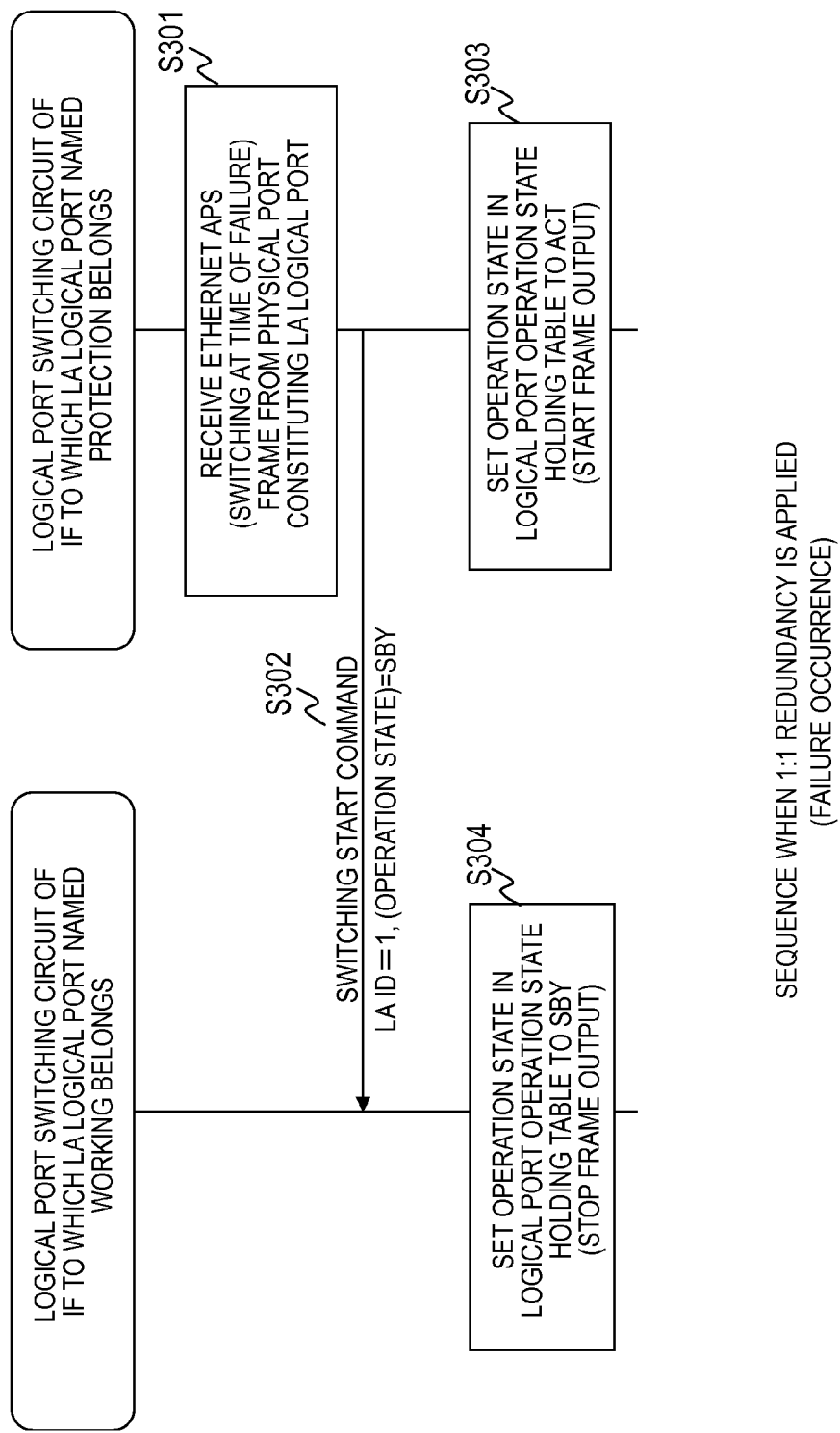
FIG. 13 is a sequence diagram of the processing of switching the LA logical port by the logical port switching circuit which has received an APS frame according to the first embodiment of this invention.

Referring to FIG. 13, a description is now given of processing by the logical port switching circuit 172 of the communication device 100-2 which receives the APS frame. The APS frame is transmitted/received only by the LA logical port 110-2 having Protection as the link name. The following description is given of the case, as an example, where the communication device 100-2 has received the Ethernet APS from the physical port 104 belonging to the LA logical port 110-2.

FIG. 13 is a sequence diagram of the processing of switching the LA logical port 110-*n* by the logical port switching circuit 172 which has received an APS frame according to the first embodiment of this invention.

The APS frame received by the IF card 102-2 of the communication device 100-2 is transferred to the logical port switching circuit 172.

The logical port switching circuit 172 analyzes details of the APS frame (S301). When the received APS frame is an APS frame for notifying the switching at the time of failure, the logical port switching circuit 172 transmits, as a switching start command, (LA ID)=1 and the operation state-SBY to the IF card 102-1 by using the communication line 180 (S302).

Then, the logical port switching circuit 172 of the IF card 102-2 searches the logical port operation state holding table 430 by using (LA ID)=1 as a search key, and changes the operation state 432 of a corresponding entry from SBY to ACT (S303). As a result, a user frame addressed to the LA logical port 110-2 having (LA ID)=1 is not discarded, but is transferred by the IF card 102-2.

When the logical port switching circuit 172 of the IF card 102-1 receives the switching start command (S302), the logical port switching circuit 172 searches the logical port operation state holding table 430 by using (LA ID)=1 as a search key, and changes the operation state 432 of a corresponding entry from ACT to SBY (S304). As a result, the user frame addressed to the LA logical port 110-1 having (LA ID)=1 is discarded by the IF card 102-1.

Figure 14:
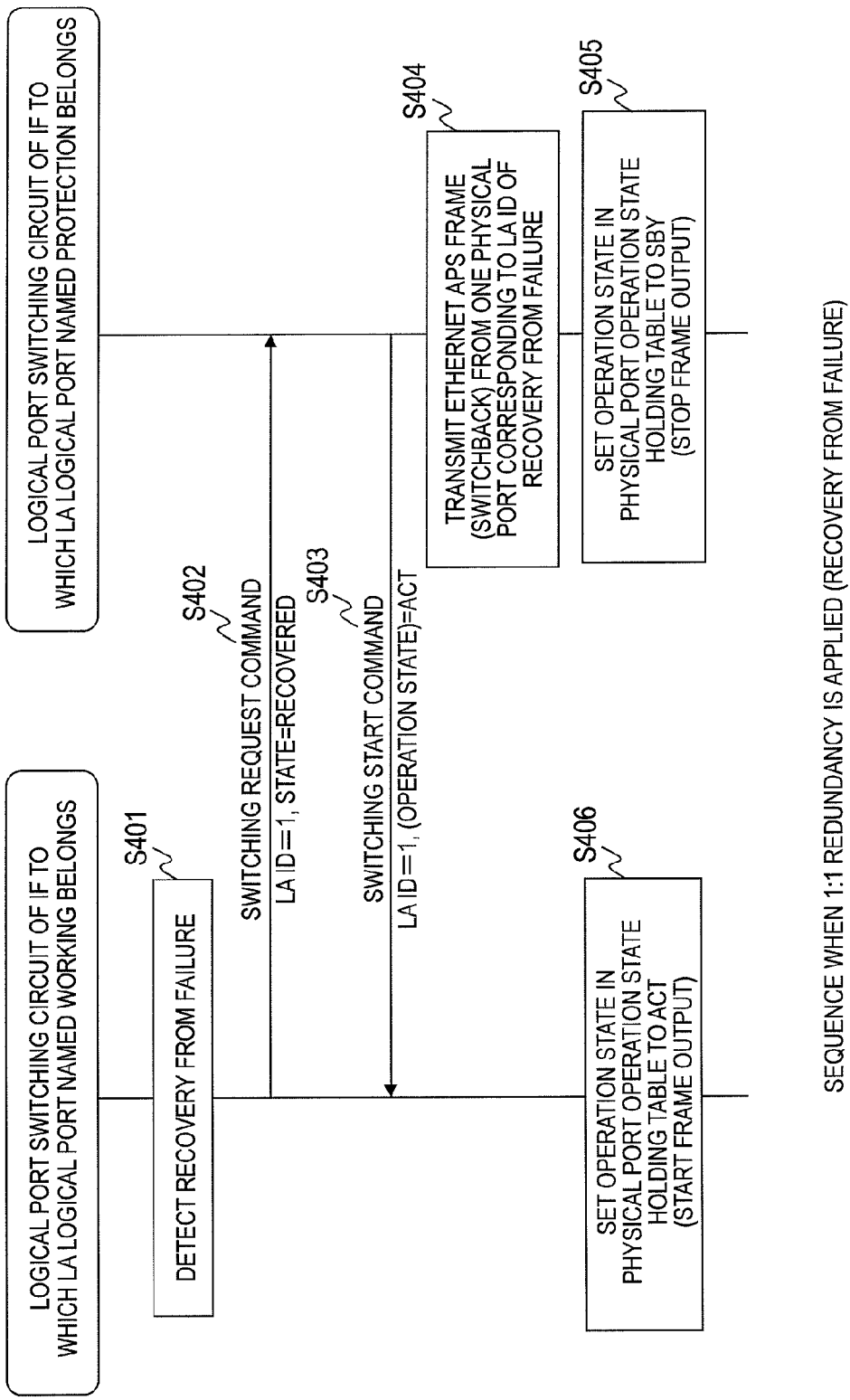
FIG. 14 is a sequence diagram of the processing of switching back the LA logical port by the logical port switching circuit which has detected a recovery of the physical port from a failure according to the first embodiment of this invention.

Referring to FIG. 14, a description is now given of steps of switching back, after a physical port belonging to the LA logical port 110-1 on the Working side has recovered from a failure, the data communication path from the Protection side to the Working side.

FIG. 14 is a sequence diagram of the processing of switching back the LA logical port 110-*n* by the logical port switching circuit 172 which has detected a recovery of the physical port 104-*n* from a failure according to the first embodiment of this invention.

On this occasion, as an example, a description is given of a case where the physical port 104-2 constituting the LA logical port 110-1 belonging to the IF card 102-1 of the communication device 100-1 recovers from a failure.

When the physical port maintenance circuit 171 receives, for example, the CC frame from the physical port 104-*n* having "failed" in the status 443 a predetermined number of times or more at a predetermined cycle, the physical port maintenance circuit 171 determines that the physical port 104-*n* has recovered from the failure, and changes the status 443 of the physical port management table 440 corresponding to the physical port 104-*n* to "normal".

The logical port switching circuit 172 periodically polls the physical port management table 440 to monitor information on the statuses 443.

When the logical port switching circuit 172 detects that the status 443 corresponding to a value "2" in the physical port ID 441 of the IF card 102-1 has changed from "failed" to "normal" (S401), the logical port switching circuit 172 acquires the LA ID 444, the LA setting 445, and the link name 446 of an entry having the value "2" in the physical port ID 441.

The logical port switching circuit 172 of the IF card 102-1 uses the communication line 180 to notify the logical port switching circuit 172 of the IF card 102-2, as a switching request command, of (LA ID)=1 and the state "recovered" (S402).

When the logical port switching circuit 172 of the IF card 102-2 detects the switching request command, the logical port switching circuit 172 transmits, as a switching start command, (LA ID)=1 and (operation state)=ACT to the logical port switching circuit 172 of the IF card 102-1 (S403).

The logical port switching circuit 172 of the IF card 102-2 transmits, after the transmission of the switching start command, an APS frame from one of the physical ports 104-*n* corresponding to the LA ID (in the above-mentioned example, one of the physical ports 104-5 to 104-8 belonging to the LA logical port 110-2 identified by (LA ID)=1), to notify the opposite communication device 100-2 of the switchback of the LA logical port to the Working side (S404). As in S206 of FIG. 12, the physical port 104-*n* having the smallest ID may transmit the APS frame.

The APS frame is generated by the logical port switching circuit 172. The logical port switching circuit 172 adds the internal header 411 to the generated APS frame, and transfers the APS frame to the egress frame processing circuit 165.

To the OAM/user frame identification field 412 of the internal header 411, information representing that the generated APS frame is an OAM frame is set. To the LA enabled/disabled field 413, "disabled" is set, and, to the port ID field 414, the smallest physical port ID belonging to the LA logical port is set. In this way, by generating the internal header while the LA enabled/disabled field 413 is set to "disabled", the OAM frame is output without being discarded by the egress frame processing circuit 165, from the physical port as specified. In this way, according to this embodiment, the APS frame can be transmitted from any physical port 104-*n* belonging to the LA logical port 110-*n*.

Then, the logical port switching circuit 172 of the IF card 102-2 searches the logical port operation state holding table 430 by using the LA ID (in the above-mentioned example, "1") as a search key, and changes the operation state 432 of a corresponding entry from ACT to SBY (S405). Thus, a user frame addressed to the LA logical port 110-2 having (LA ID)=1 has been discarded by the IF card 102-2.

When the logical port switching circuit 172 of the IF card 102-1 receives the switching start command (S403), the logical port switching circuit 172 searches the logical port operation state holding table 430 by using the LA ID as a search key, and changes the operation state 432 of a corresponding entry from SBY to ACT (S406). As a result, the user frame addressed to the LA logical port 110-1 having (LA ID)=1 is transferred without being discarded by the IF card 102-1.

Figure 15:
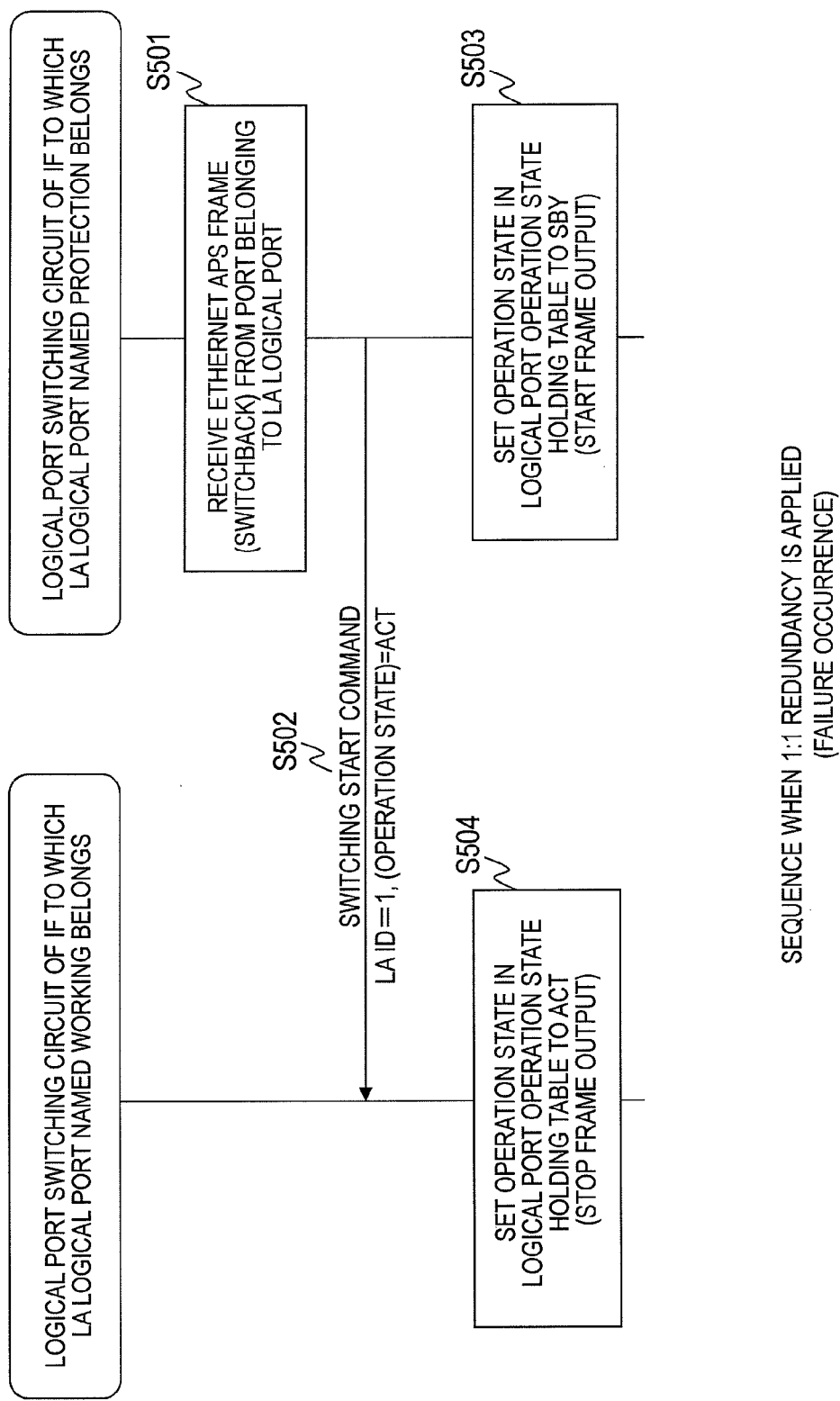
FIG. 15 is a sequence diagram of the processing of switching back the LA logical port by the logical port switching circuit which has received the APS frame according to the first embodiment of this invention.

Referring to FIG. 15, a description is now given of processing by the logical port switching circuit 172 of the communication device 100-2 which receives the APS frame. The following description is given of the case, as an example, where the communication device 100-2 has received the Ethernet APS frame from the physical port 104 belonging to the LA logical port 110-2.

FIG. 15 is a sequence diagram of the processing of switching back the LA logical port 110-$n$ by the logical port switching circuit 172 which has received an APS frame according to the first embodiment of this invention.

The APS frame received by the IF card 102-2 of the communication device 100-2 is transferred to the logical port switching circuit 172.

The logical port switching circuit 172 analyzes details of the APS frame (S501). When the received APS frame is an APS frame for notifying of the switching back, the logical port switching circuit 172 transmits, as a switching start command, (LA ID)=1 and (operation state)=ACT to the IF card 102-1 by using the communication line 180 (S502).

Then, the logical port switching circuit 172 of the IF card 102-2 searches the logical port operation state holding table 430 by using the LA ID (in the above-mentioned example, (LA ID)=1) as a search key, and changes the operation state 432 of a corresponding entry from ACT to SBY (S503). As a result, a user frame addressed to the LA logical port 110-2 having (LA ID)=1 is discarded.

When the logical port switching circuit 172 of the IF card 102-1 receives the switching start command (S502), the logical port switching circuit 172 searches the logical port operation state holding table 430 by using the LA ID as a search key, and changes the operation state 432 of a corresponding entry from SBY to ACT (S504). As a result, the user frame addressed to the LA logical port 110-1 having (LA ID)=1 is transferred without being discarded by the IF card 102-1.

On this occasion, by setting the polling cycle for the physical port management table 440 by the physical port maintenance circuit 171 and the logical port switching circuit 172 to a short time period such as 3.33 milliseconds, the detection time of the CC frame and the failure is reduced, resulting in a restraint of the LA logical port switching time period to be equal to or less than 50 milliseconds.

Moreover, by holding the logical port operation state holding table 430 on the SW card 103, and accordingly, by causing the SW card 103 to transfer data to the LA logical port 110-$n$ only on the ACT side, the data can be restrained from being transferred from the SW card 103 to the LA logical port 110-$n$ on the SBY side. In this way, transfer of unnecessary frames from the SW card 103 to the IF card 102-$n$ is eliminated, and other data can be transmitted to the IF card 102-$n$.

According to this embodiment, an increase in bandwidth by the link aggregation, a decrease in switching time period at the time of failure by the 1:1 Ethernet APS, and a continued service maintaining the communication bandwidth when the IF card fails can be simultaneously realized.

Second Embodiment

A detailed description is now given of a second embodiment of this invention referring to the drawings. A difference in configuration between the second embodiment and the first embodiment of this invention is that, while the first embodiment has the 1:1 redundant configuration, the second embodiment has a 1+1 redundant configuration. Out of the components of the communication system of this embodiment, components assigned with the same reference numerals as those of the components of the communication system of the first embodiment have, except for differences described later, the same functions as those of the components assigned with the same reference numerals of the communication system of the first embodiment, and a description thereof is therefore omitted.

Figure 16:
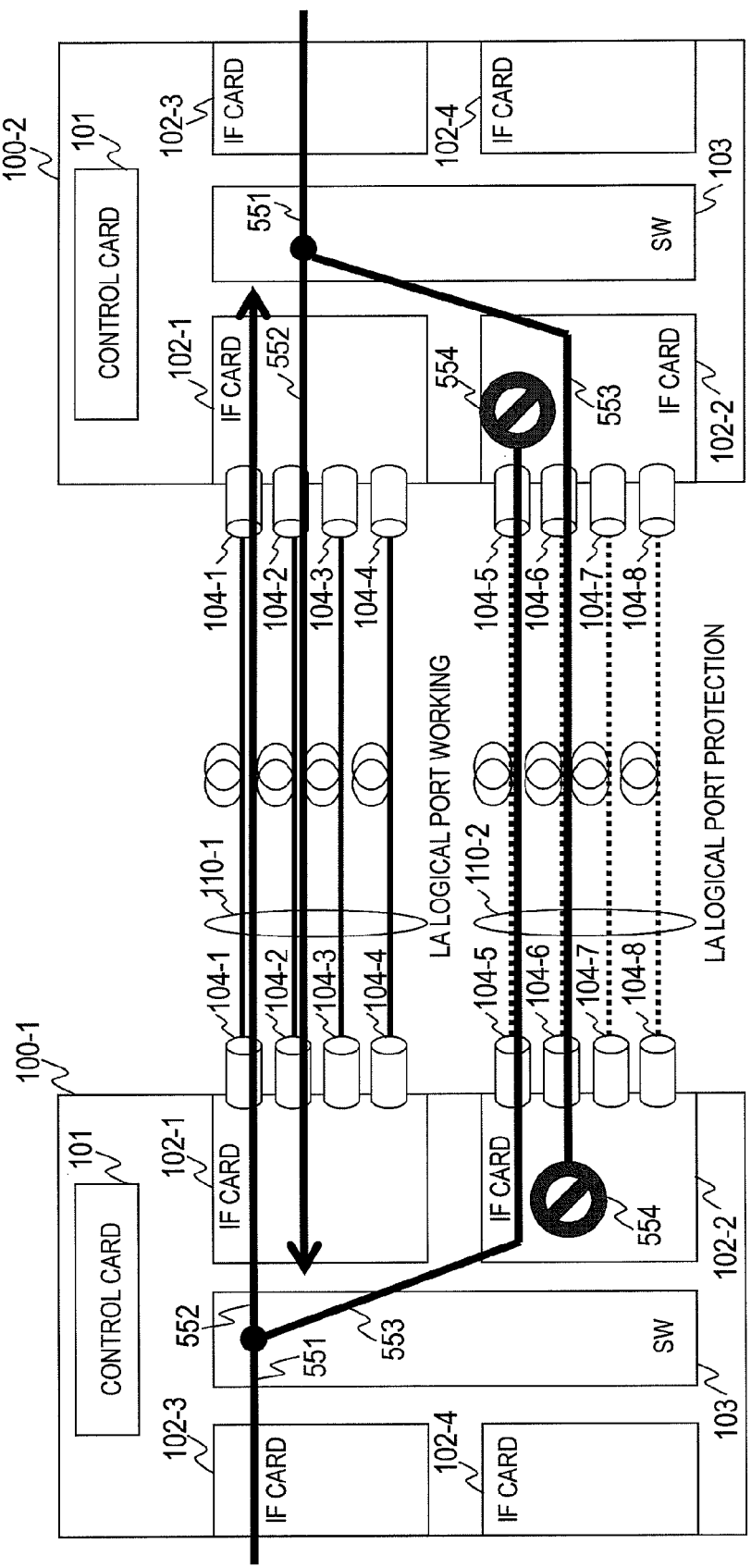
FIG. 16 is an explanatory diagram of flows of the Ethernet frames in the communication system according to a second embodiment of this invention.

FIG. 16 is an explanatory diagram of flows of the Ethernet frames in the communication system according to the second embodiment of this invention, and specifically, illustrates flows of the Ethernet frames when the communication devices 100-1 and 100-2 take the 1+1 redundant configuration. In the 1+1 redundant configuration, the same Ethernet frame is transmitted to the LA logical ports 110-1 and 110-2.

The IF cards 102-3 and 102-4 of the communication devices 100-1 and 100-2 are coupled to other devices (in other words, communication devices other than the communication devices 100-1 and 100-2) (not shown). The communication device 100-1 first transfers an Ethernet frame received from another device (not shown) to the SW card 103 (551). The SW card 103 duplicates the received Ethernet frame when a destination of the received Ethernet frame is the LA logical ports 110-1 and 110-2, which are configured to be redundant, and transfers the Ethernet frames to the IF cards 102-1 and 102-2 to which the LA logical ports 110-1 and 110-2 belong. The IF cards 102-1 and 102-2 respectively transmit the Ethernet frame from any of the physical ports 104-$n$ (552 and 553).

When the 1+1 redundant configuration is applied, an Ethernet frame is transferred to the opposite communication device 100-$n$ by using both of the LA logical port 110-$n$ in the ACT state and the LA logical port 110-$n$ in the SBY state, and the Ethernet frame transferred passing through the LA logical port 110-$n$ in the SBY state of the communication device 100-$n$ on the reception side is discarded (554).

Differences between the components of the communication device 100 of the second embodiment and the components of the communication device 100 of the first embodiment include such a point that the logical port/physical port correspondence table 420 illustrated in FIG. 9 can also be referred to by the ingress frame processing circuit 162, and such a point that the logical port operation state holding table 430 illustrated in FIG. 10 is arranged in the ingress frame processing circuit, and those components are the same in all the other points.

Thus, the differences between the communication device 100 of the first embodiment and the communication device 100 of the second embodiment are only the ingress frame processing circuit 162 and the egress frame processing circuit 165.

All the other processing circuits have the same processing operations as those of the communication device 100 of the first embodiment, and a description is only given of operations of the ingress frame processing circuit 162 and the egress frame processing circuit 165.

The egress frame processing circuit 165 includes the logical port/physical port correspondence table 420. Referring to FIG. 9, a description is given of a detailed operation of the egress frame processing circuit 165.

When the egress frame processing circuit 165 receives the Ethernet frame, the egress frame processing circuit 165 first analyzes the internal header 411 assigned to the received Ethernet frame to check whether the value of the LA enabled/disabled field 413 of the internal header 411 is "enabled" or "disabled".

When the value of the LA enabled/disabled field 413 is "enabled", the egress frame processing circuit 165 acquires the port ID field 414 from the internal header 411.

At this time, to the value of the port ID field 414 of the internal header 411, not an ID of a physical port, but an ID of an LA logical port is set.

Then, the egress frame processing circuit 165 determines a physical port 104-n for outputting the received Ethernet frame. First, the egress frame processing circuit 165 considers the port ID field 414 acquired from the internal header 411 as an LA ID, searches the logical port/physical port correspondence table 420, and acquires all physical ports belonging to an LA logical port 110-n (namely, a logical port 110-n identified by the value of the LA ID in the port ID field 414). As illustrated in FIG. 9, the logical port/physical port correspondence table 420 includes the physical port IDs 421 and the LA IDs 422, and, by referring to the table, the LA ID of the LA logical port 110-n to which the physical port 104-n belongs can be acquired. For example, when the received frame is addressed to the LA logical port 110-n, and the port ID field 414 is "1", the egress frame processing circuit 165 can identify, by considering (port ID)=1 as (LA ID)=1 to search the logical port/physical port correspondence table 420, that IDs of the physical ports belonging to the LA logical port 110-n are 1, 2, 3, and 4.

Then, the egress frame processing circuit 165 collects, from an Ethernet frame following the internal header 411, address information such as the MAC address, the VID, the LSP ID of the MPLS, and the IP address, inputs these pieces of header information as a hash key into the hash function circuit (now shown), and determines an output destination physical port ID. A used hash function circuit and a method of determining the physical port based on the hash value may be the same as those of the first embodiment, and a description thereof is therefore omitted.

Then, the egress frame processing circuit 165 overwrites the value in the port ID field 414 of the internal header 411 by the physical port ID determined by the calculation result of the hash function. As a result, the output destination physical port of the Ethernet frame is determined.

After the above-mentioned processing has been completed, the egress frame processing circuit 165 transfers the received Ethernet frame to the data DMX circuit 166.

The egress frame processing circuit 165 according to the second embodiment does not have the function (S109 in FIG. 6) of discarding the Ethernet frame received from the SW reception circuit. As a result, irrespective of whether the state of the LA logical port 110-n is ACT or SBY, the Ethernet frame can be output to the LA logical port 110-n.

A description is now given of an operation when a frame having the value of "disabled" in the LA enabled/disabled field 413 of the internal header 411 is received. When the egress frame processing circuit 165 receives a frame having a value of "disabled" in the LA enabled/disabled field, the egress frame processing circuit 165 does not carry out any processing, and transfers the received Ethernet frame to the data DMX circuit 166.

The LA enabled/disabled field 413 of the internal header 411 of the OAM frame and the APS frame is always set to "disabled." Therefore, even when the Ethernet frame received from the maintenance switching circuit unit 170 is addressed to the LA logical port 110-n, and the Ethernet frame is an OAM frame or an APS frame, the frame can be output from the physical port 104-n specified by the maintenance switching circuit unit 170.

Summarizing the above description, the egress frame processing circuit 165 of the second embodiment executes the same processing as the egress frame processing circuit 165 of the first embodiment illustrated in FIG. 6, except for such a point that when the egress frame processing circuit 165 of the second embodiment determines in S102 that the LA enabled/disabled field 413 of the internal header 411 is "disabled", the egress frame processing circuit 165 carries out S110 without carrying out S111 to S114, and when the egress frame processing circuit 165 determines in S105 that the operation state is SBY, the egress frame processing circuit 165 carries out S110 without carrying out S109. Therefore, a flowchart illustrating the processing by the egress frame processing circuit 165 according to this embodiment is not shown.

Figure 17:
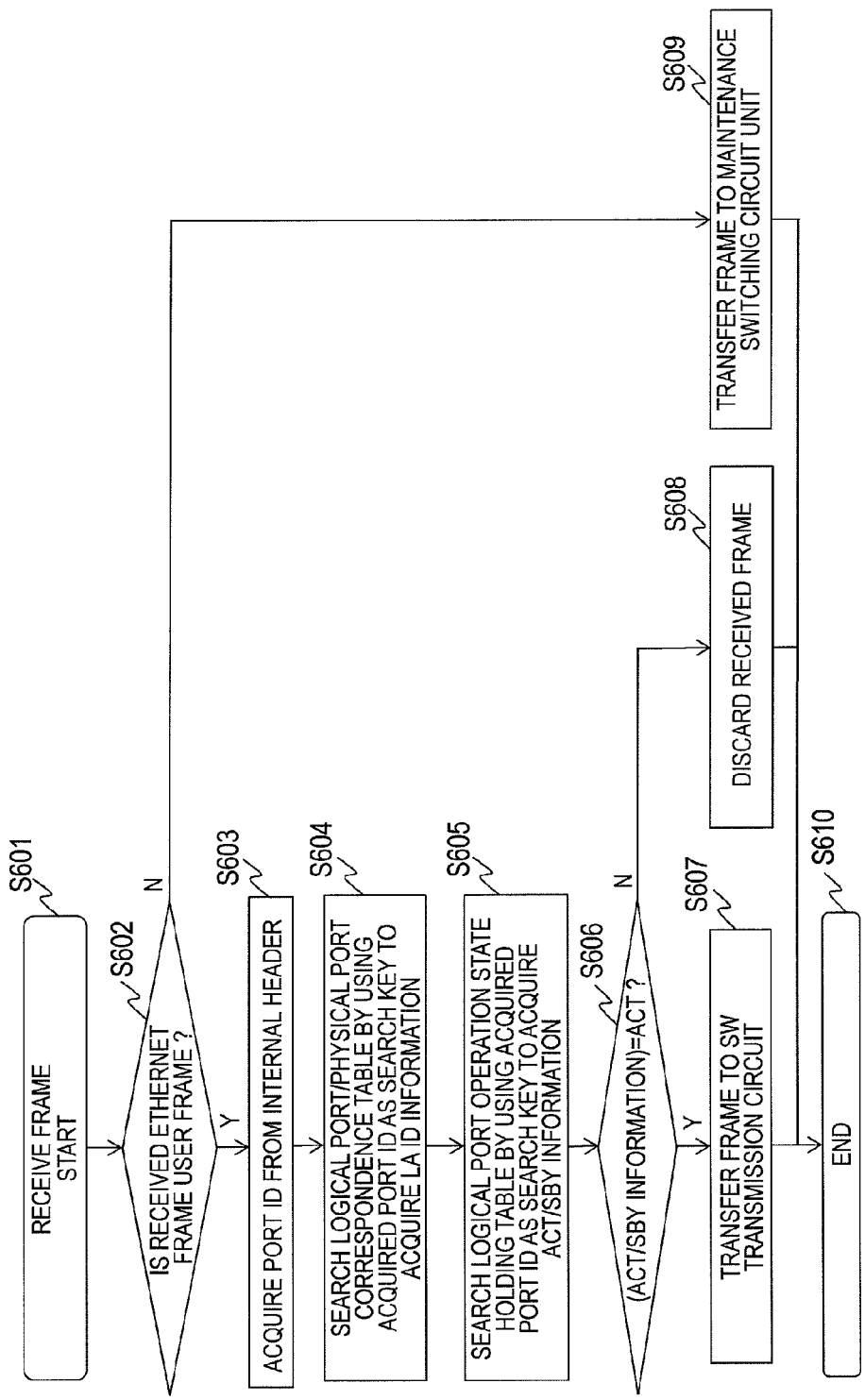
FIG. 17 is a processing flowchart of an ingress frame processing circuit according to the second embodiment of this invention.

Referring to FIGS. 9, 10, and 17, a description is now given of processing by the ingress frame processing circuit 162.

FIG. 17 is a processing flowchart of the ingress frame processing circuit 162 according to the second embodiment of this invention.

When the ingress frame processing circuit 162 receives an Ethernet frame, the ingress frame processing circuit 162 analyzes the Ethernet frame to identify whether the received frame is a user frame or an OAM frame (S602). By referring to the type field of the MAC header of the received frame, whether the received frame is a user frame or an OAM frame can be identified. The type field of the OAM frame takes a certain fixed value.

When the received Ethernet frame is an OAM frame, the ingress frame processing circuit 162 transfers the received Ethernet frame to the maintenance switching circuit unit 170 (S609).

When the received Ethernet frame is a user frame, the ingress frame processing circuit 162 acquires a port ID from the port ID field 414 of the internal header 411 (S603).

Then, the ingress frame processing circuit 162 searches, by using the acquired port ID as a search key, the logical/physical correspondence table 420 to acquire an LA ID corresponding to the port ID (S604).

Then, the ingress frame processing circuit 162 searches, by using the LA ID acquired from the logical/physical correspondence table 420 as a search key, the logical port operation state holding table 430 to acquire information on the operation state 432 corresponding to the LA ID (S605).

Then, the ingress frame processing circuit 162 determines whether or not the operation state 432 acquired from the logical port operation state holding table 430 is ACT (S606).

When the operation state 432 is ACT, the ingress frame processing circuit 162 transfers the Ethernet frame to the SW transmission circuit 163 (S607).

When the operation state 432 is SBY, the ingress frame processing circuit 162 applies discard processing to the Ethernet frame.

As a result, in the case where the 1+1 redundant configuration is applied, the Ethernet frame received from the LA logical port 110-n on the SBY side can be discarded.

According to this embodiment, an increase in bandwidth by the link aggregation, a decrease in switching time period at the time of failure by the Ethernet APS in the case where the 1+1 redundant configuration is applied, and a continued service maintaining the communication bandwidth when the IF card fails can be simultaneously realized.

Third Embodiment

A detailed description is now given of a third embodiment of this invention referring to the drawings. A difference in configuration between the third embodiment of this invention and the first and second embodiments of this invention is that, while the first and second embodiments are the methods of realizing redundancy of the LA logical port 110-*n* between the neighboring communication devices 100-1 and 100-2, the third embodiment is a method of realizing redundancy of the LA logical port in a case where a relay network of a communication carrier constructed by a plurality of other communication devices exists between a communication device 500-1 and an opposite communication device 500-2.

According to the third embodiment, LA logical ports are constructed between the communication device 500-1 and the communication device 500-2 at remote locations, and when the normality of a physical port belonging to an LA logical port is checked by the OAM function, and a physical port fails, the communication devices 500-1 and 500-2 have remote port maintenance circuits 571 in order to realize switching of the LA logical ports by using the APS function.

Out of the components of the communication system of this embodiment, components assigned with the same reference numerals as those of the components of the communication system of the first and second embodiments have, except for differences described later, the same functions as those of the components assigned with the same reference numerals of the communication systems of the first and second embodiments, and a description thereof is therefore omitted.

Figure 18:
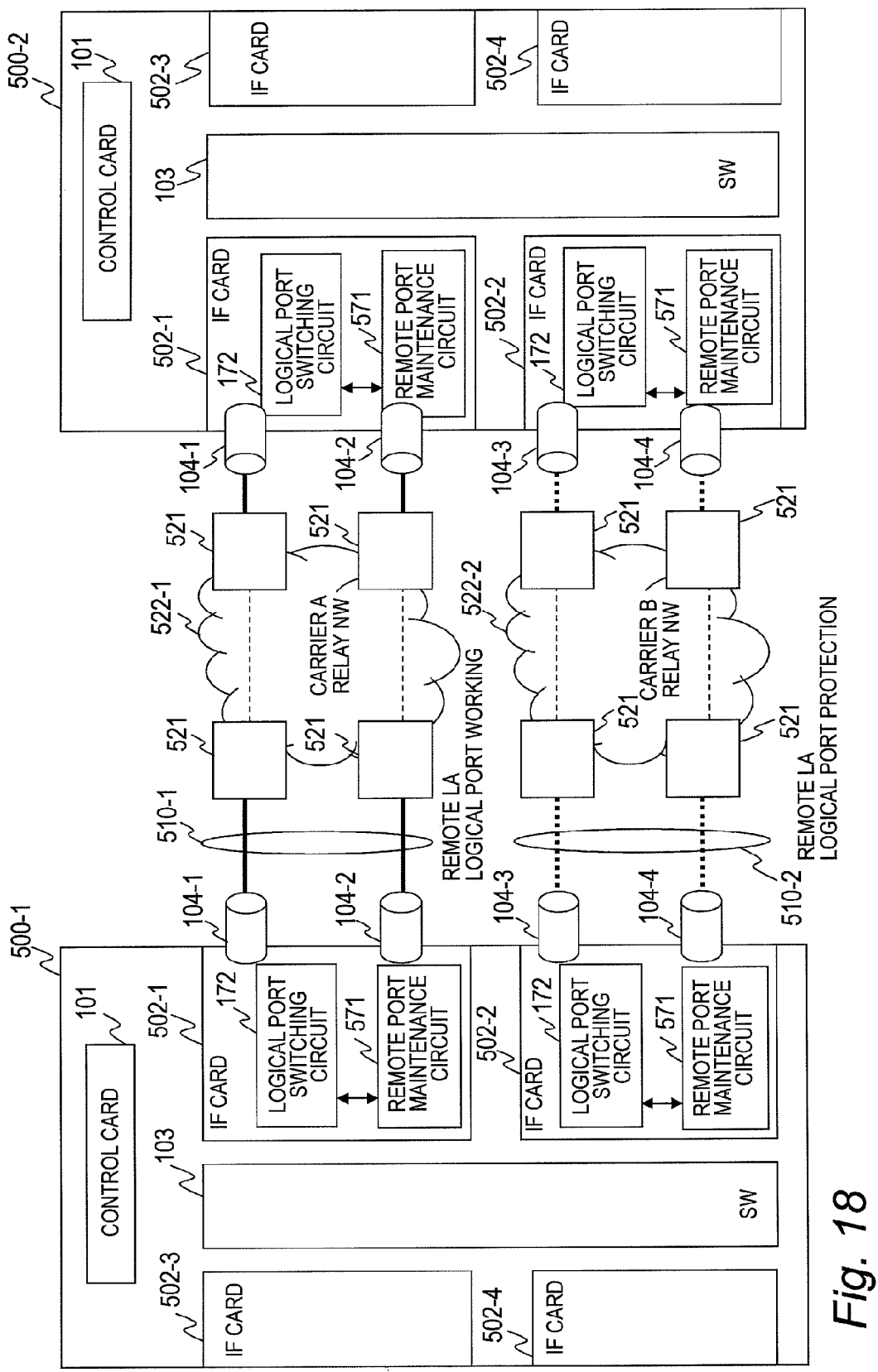
FIG. 18 is a block diagram illustrating a configuration of the communication system according to a third embodiment of this invention.

FIG. 18 is a block diagram illustrating a configuration of the communication system according to the third embodiment of this invention.

In FIG. 18, the communication devices 500-1 and 500-2 according to this invention are coupled to each other by means of a carrier A relay network 522-1 and a carrier B relay network 522-2.

Each of the carrier relay networks includes a plurality of relay devices 521.

The communication devices 500-1 and 500-2 are coupled to, via the physical ports 104-1 and 104-2, relay devices 521 constituting the carrier A relay network, and are coupled to, via the physical ports 104-3 and 104-4, relay devices 521 constituting the carrier B relay network. The relay device 521 is a device for carrying out data transfer in the carrier relay network by converting or encapsulating, when receiving an Ethernet frame from the communication device 500-*n*, the Ethernet frame into a communication protocol used in the carrier relay network.

The physical ports 104-1 and 104-2 of the communication devices 500-1 and 500-2 are aggregated by means of the link aggregation function, and are treated as a remote LA logical port 510-1. Similarly, the physical ports 104-3 and 104-4 of the communication devices 500-1 and 500-2 are aggregated by means of the aggregation function, and are treated as a remote LA logical port 510-2. It should be noted that the remote LA logical ports 510-1 and 510-2 are configured to be redundant.

It should be noted that the control card 101, the SW card 103, and the physical ports 104-*n* illustrated in FIG. 18 have the same functions as those of those described in the first and second embodiments, and a description thereof is therefore omitted.

In the example of FIG. 18, the remote LA logical port 510-1 is referred to as Working, the remote LA logical port 510-2 is referred to as Protection, a state of the remote LA logical port 510-1 is set to ACT where communication is carried out, and the state of the remote LA logical port 510-2 is set to SBY used when a physical port belonging to the remote LA logical port 510-1 fails. These states are referred to as Working ACT and Protection SBY. In the third embodiment, a description is given below of means for realizing the 1:1 redundancy and the 1+1 redundancy between the remote LA logical port 510-1 of an IF card 502-1 and the remote LA logical port 510-2 of an IF card 502-2.

Figure 19:
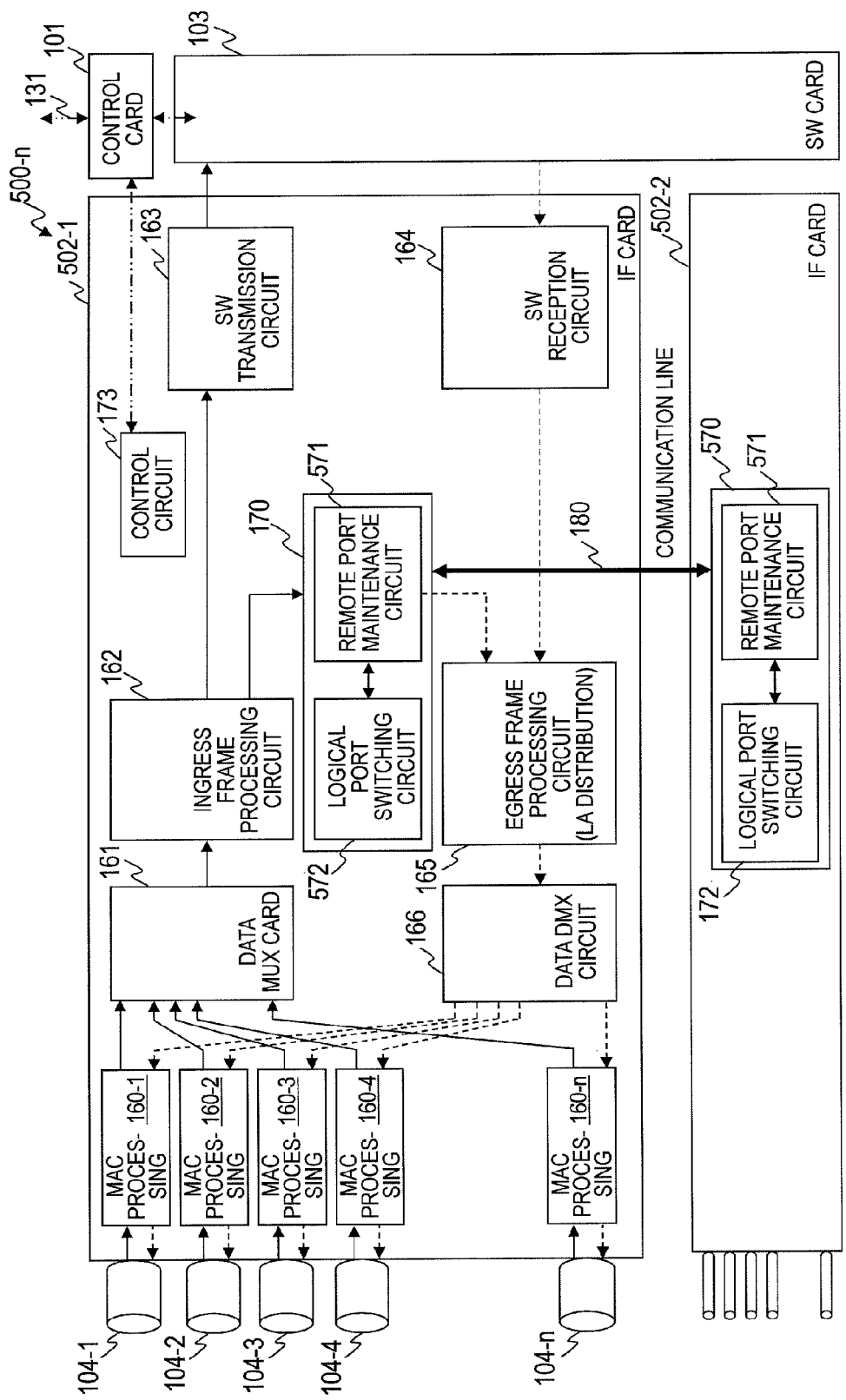
FIG. 19 is a functional block diagram of a communication device of the communication system according to the third embodiment of this invention.

Referring to FIG. 19, a description is given of a functional block configuration of the IF card 502-*n* of the communication device 500-*n* for realizing the redundancy of the remote LA logical port as described above.

FIG. 19 is a functional block diagram of the communication device 500-*n* of the communication system according to the third embodiment of this invention.

The communication device 500-*n* includes the control card 101, the IF cards 502-*n*, and the SW card 103.

Differences between this embodiment and the first and second embodiments include only the remote port maintenance circuit 571 for checking normality of the physical ports 104-1 to 104-4 between the communication device 500-1 and the communication device 500-2 coupled to each other by using the carrier relay networks and a part of the processing operation when the logical port switching circuit 572 generates an OAM frame. The other components of this embodiment have the same functions as those of the first and second embodiments, and a description thereof is therefore omitted.

The remote port maintenance circuit 571 and the logical port switching circuit 572 include a physical port management table 540 illustrated in FIG. 20.

FIG. 20 is an explanatory diagram of the physical port management table 540 held by the communication device 500-*n* according to the third embodiment of this invention.

The configuration of the physical port management table 540 according to the third embodiment is the same as the physical port management table 440 according to the first and second embodiments except for such a point that an OAM level 541 is added.

The Ethernet OAM can separate a normality monitoring segment by the OAM depending on the OAM level.

Figure 21:
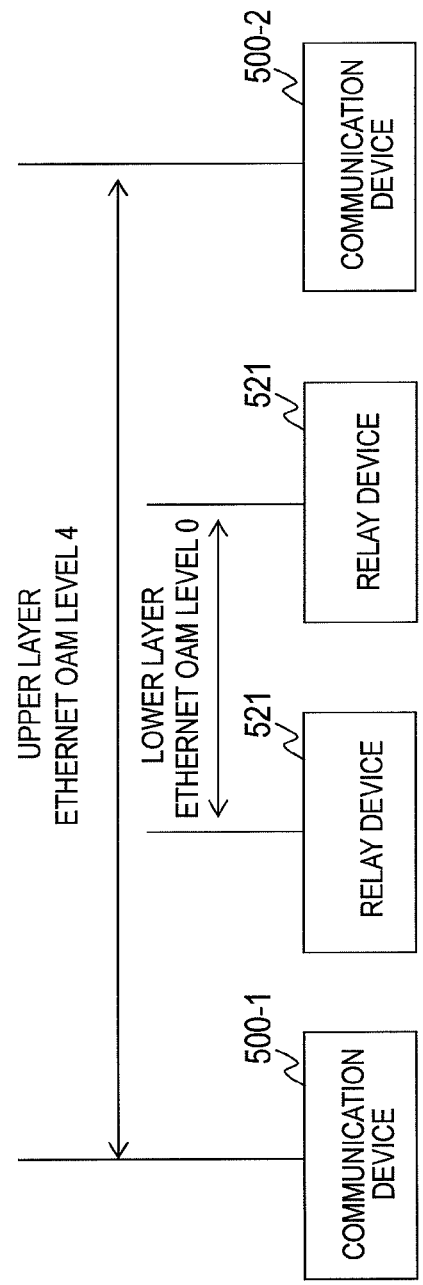
FIG. 21 is an explanatory diagram of a separation of normality monitoring segments depending on an OAM level according to the third embodiment of this invention.

FIG. 21 is an explanatory diagram of the separation of the normality monitoring segment depending on the OAM level according to the third embodiment of this invention.

For example, as illustrated in FIG. 21, between the relay devices 521 in the carrier relay network, the maintenance management can be carried out by means of the Ethernet OAM, and, also between the communication devices 500-*n*, the maintenance management can be carried out by means of the Ethernet OAM.

The standards of the Ethernet OAM include such a prescription that, when a device operating the Ethernet OAM receives an OAM frame equal to or lower in level than the OAM used by the device, the device carries out termination processing. Therefore, as in the example of FIG. 21, when an OAM level 0 of the Ethernet OAM is used between the relay devices 521 in the carrier relay network, a value equal to or more than 1 needs to be used as the OAM level of the Ethernet OAM between the communication devices 500-*n*.

In the physical port management table 540, the level of OAM frames transmitted from each of the physical ports 104-*n* can be arbitrarily specified by using the OAM level 541.

The remote port maintenance circuit 571 and the logical port switching circuit 572 refer to the physical port management table 540 to set, when an OAM frame is generated, the value of the OAM level 541 set on the physical port management table 540 to the payload of the OAM frame. By setting the OAM level 541 set in the physical port management table 540 to a value larger than the OAM level used in the relay network, the OAM frame transmitted from the communication device 500-$n$ is prevented from being discarded by the relay device 521.

Specifically, for example, as illustrated in FIG. 20, when the OAM level of each of the physical ports 104-$n$ is set to "4", and any of the physical port 104-$n$ has not received a CC frame (OAM frame) to which "4" in the OAM level is set for a predetermined time period, the remote port maintenance circuit 571 determines that the physical port 104-$n$ is failed, and then, when the physical port receives a CC frame to which "4" in the OAM level is set a predetermined number of times or more at a predetermined cycle, it is determined that the physical port 104-$n$ has recovered. On the other hand, when the physical port 104-$n$ receives a CC frame to which an OAM level exceeding "4" is set, the remote port maintenance circuit 571 does not use the CC frame to check the normality of the physical port 104-$n$, and the communication device 500-$n$ transmits the CC frame to another communication device 500-$n$ or relay device 521.

Processing operations of the remote port maintenance circuit 571 and the logical port switching circuit 572 according to the third embodiment are the same as the processing operations of the physical port maintenance circuit 171 and the logical port switching circuit 172 except for the above-mentioned normality check processing for the physical port considering the OAM level, and a description thereof is therefore omitted. Specifically, the processing for the frame in the communication device 500-$n$ according to this embodiment is the same as the processing in FIG. 6 or 7. The state (ACT/SBY) switching processing for the remote LA logical port 510-$n$ by the communication device 500-$n$ according to this embodiment is the same as that in FIGS. 12 to 15.

Though both of a conventional link aggregation (such as one described in Japanese Patent Application Laid-open No. 2008-160227) and a conventional protection switching (such as one described in ITU-T G.8031/Y.1342 Ethernet linear Protection Switching) can be used for configuring a physical link to be redundant between neighboring devices, the conventional link aggregation and the conventional protection switching cannot be used in a form where communication devices a physical link between which needs to be configured to be redundant are coupled to each other via relay networks. In contrast, according to this embodiment, an increase in bandwidth by the link aggregation, a decrease in switching time period at the time of failure by the Ethernet APS in the case where the 1:1 redundancy configuration or 1+1 redundancy configuration is applied, and a continued service maintaining the communication bandwidth when the IF card fails can be simultaneously realized in the application form where a relay network constructed by other communication devices exists between the communication devices.

Fourth Embodiment

A detailed description is now given of a fourth embodiment of this invention referring to the drawings. A difference in configuration between the fourth embodiment and the third embodiment is that while the remote LA logical ports are configured to be redundant between the communication devices 500-1 and 500-2 in the third embodiment, in the fourth embodiment, the communication device opposite to the communication device 500-1 is separated into communication devices 700-1 and 700-2.

Out of the components of the communication system of this embodiment, components assigned with the same reference numerals as those of the components of the communication system of the first to third embodiments have, except for differences described later, the same functions as those of the components assigned with the same reference numerals of the communication systems of the first to third embodiments, and a description thereof is therefore omitted.

Figure 22:
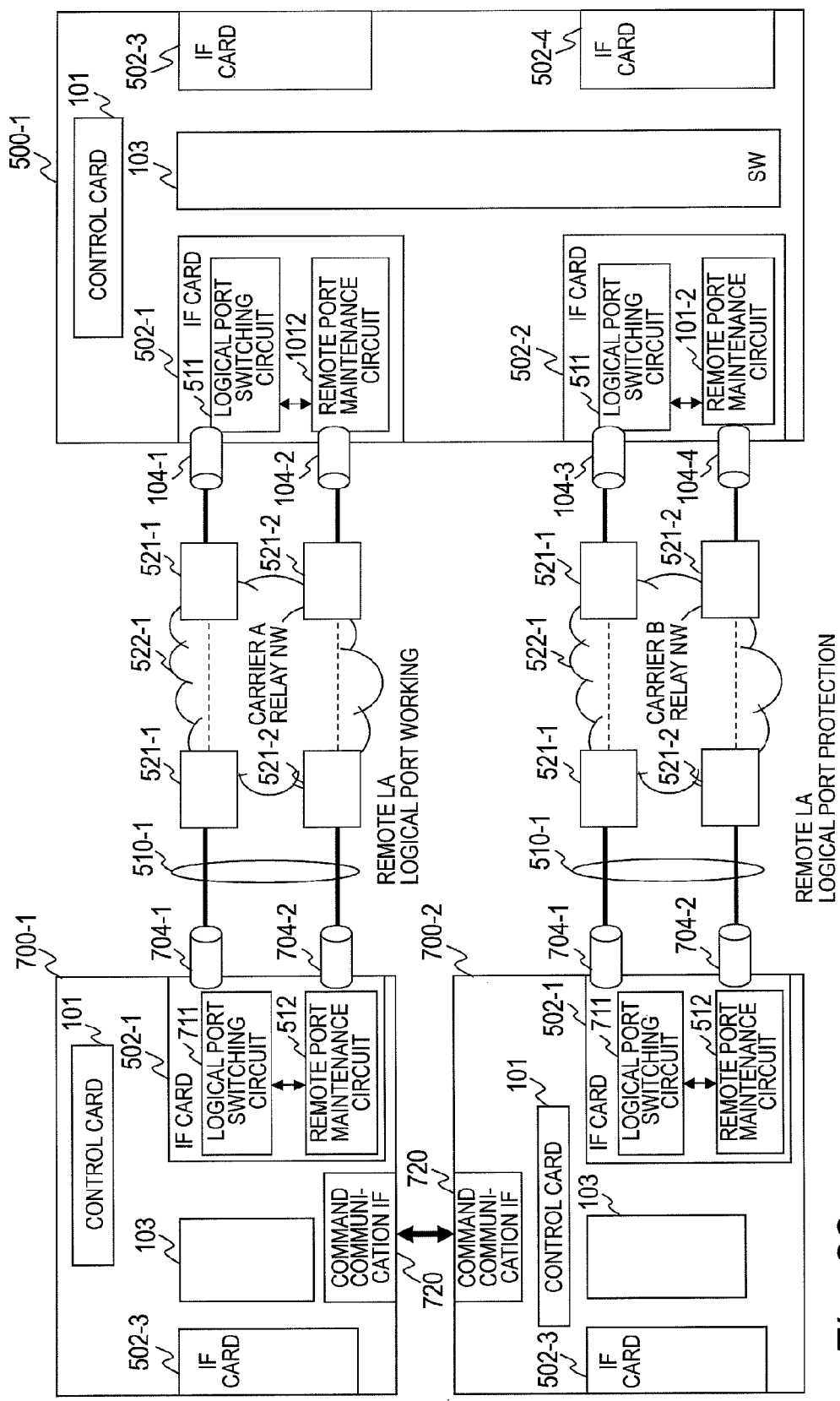
FIG. 22 is a block diagram illustrating a configuration of the communication system according to a fourth embodiment of this invention.

FIG. 22 is a block diagram illustrating a configuration of the communication system according to the fourth embodiment of this invention.

In FIG. 22, the communication device 700-1 and the communication device 700-2 are coupled to each other via command communication IF cards 720. The communication device 700-1 is coupled via the carrier A relay network 522-1 to the communication device 500-1, and the communication device 700-2 is coupled via the carrier B relay network 522-2 to the communication device 500-1.

Each of the carrier relay networks 522-$n$, the plurality of relay devices 521-$n$, and the communication device 500-1 respectively have the same functions as those of each of the carrier relay networks 522-$n$, the plurality of relay devices 521, and the communication device 500-1 (or communication device 500-2) in the third embodiment, and a description thereof is therefore omitted.

The communication device 700-1 is coupled via physical ports 704-1 and 704-2 to relay devices 521-1 and 521-2 constituting the carrier A relay network 522-1.

The communication device 700-2 is coupled via physical ports 704-1 and 704-2 to relay devices 521-1 and 521-2 constituting the carrier B relay network 522-2.

The physical ports 704-1 and 704-2 of the communication devices 700-1 are aggregated by means of the link aggregation function, and are treated as a remote LA logical port 510-1.

Similarly, the physical ports 704-1 and 704-2 of the communication devices 700-2 are aggregated by means of the link aggregation function, and are treated as a remote LA logical port 510-2. It should be noted that the remote LA logical ports 510-1 and 510-2 are configured to be redundant though those remote LA logical ports belong to different communication devices.

It should be noted that the control card 101, the SW card 103, and the physical ports 104-$n$ illustrated in FIG. 22 have the same functions as those of the control card 101, the SW card 103, and the physical ports 104-$n$ described in the first and second embodiments, and a description thereof is therefore omitted.

In the example in FIG. 22, the remote LA logical port 510-1 is referred to as Working, the remote LA logical port 510-2 is referred to as Protection, a state of the remote LA logical port 510-1 is set to ACT where communication is carried out, and the state of the remote LA logical port 510-2 is set to SBY used when a physical port belonging to the remote LA logical port 510-1 fails. These states are referred to as, Working ACT and Protection SBY. In the fourth embodiment, a description is given below of means for realizing the 1:1 redundancy and the 1+1 redundancy between the remote LA logical port 510-1 of the communication device 700-1 and the remote LA logical port 510-2 of the communication device 700-2.

Figure 23:
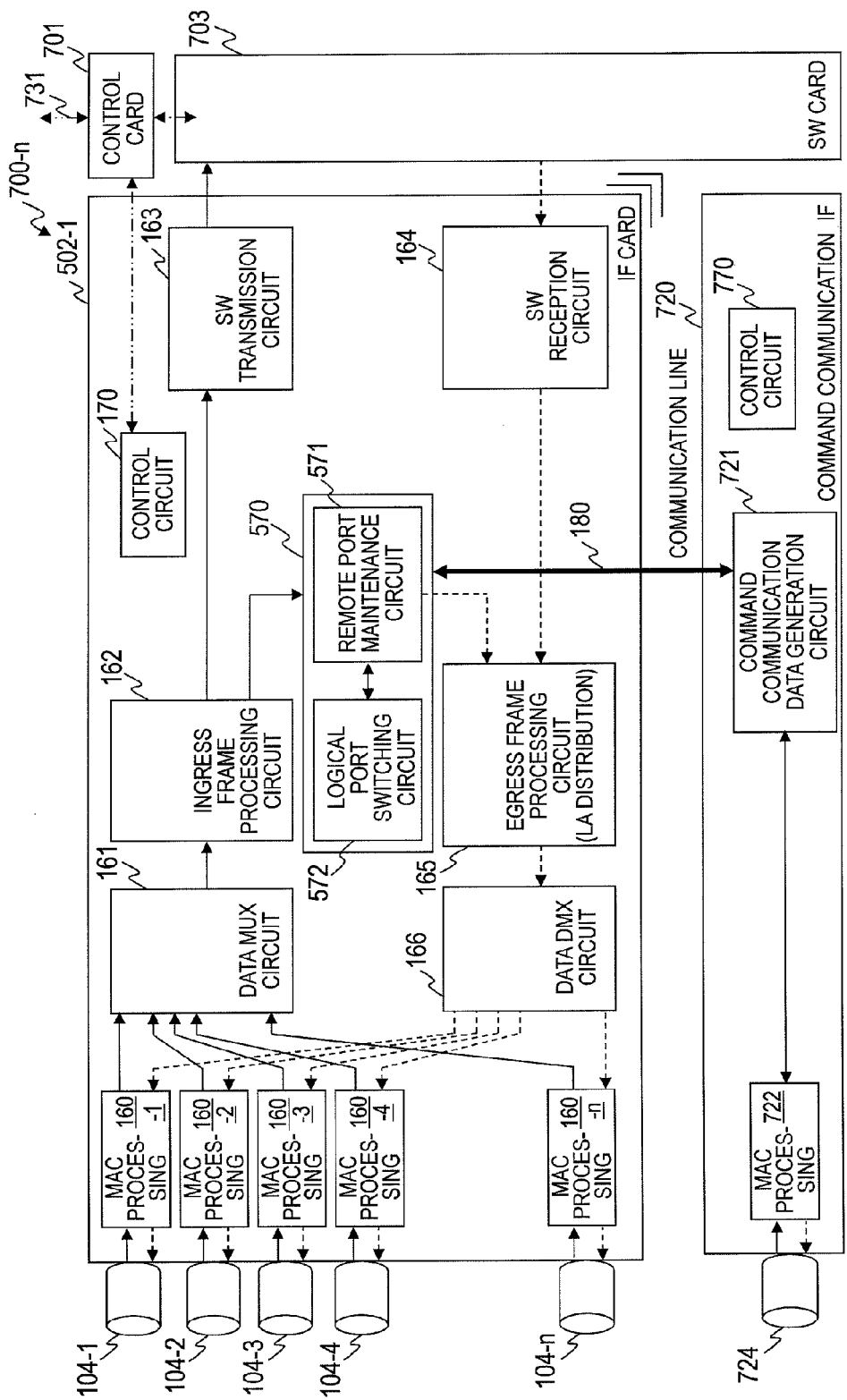
FIG. 23 is a functional block diagram of a communication device of the communication system according to the fourth embodiment of this invention.

Referring to FIG. 23, a description is given of a functional block configuration of the communication device 700-$n$ for realizing the redundancy of the remote LA logical ports 510-$n$ belonging to different communication devices as described above.

FIG. 23 is a functional block diagram of the communication device 700-$n$ of the communication system according to the fourth embodiment of this invention.

The communication device 700-$n$ includes the control card 101, the IF cards 502-$n$, a command communication IF card 720, and the SW card 103.

Only differences between this embodiment and the third embodiment are such a point that the command communication IF card 720 exists and such a point that the communication line 180 of the IF card 502-*n* is coupled to the command communication IF card 720. All the other components of this embodiment have the same functions as those of the third embodiment, and a description thereof is therefore omitted.

The command communication IF card 720 includes a command communication data generation circuit 721, a control circuit 770, and a MAC processing circuit 722.

The control circuit 770 and the MAC processing circuit 722 have the same functions as those of the control circuit 173 and the MAC processing circuit 160-1 according to the third embodiment and the like, and a description thereof is therefore omitted.

Figure 24:
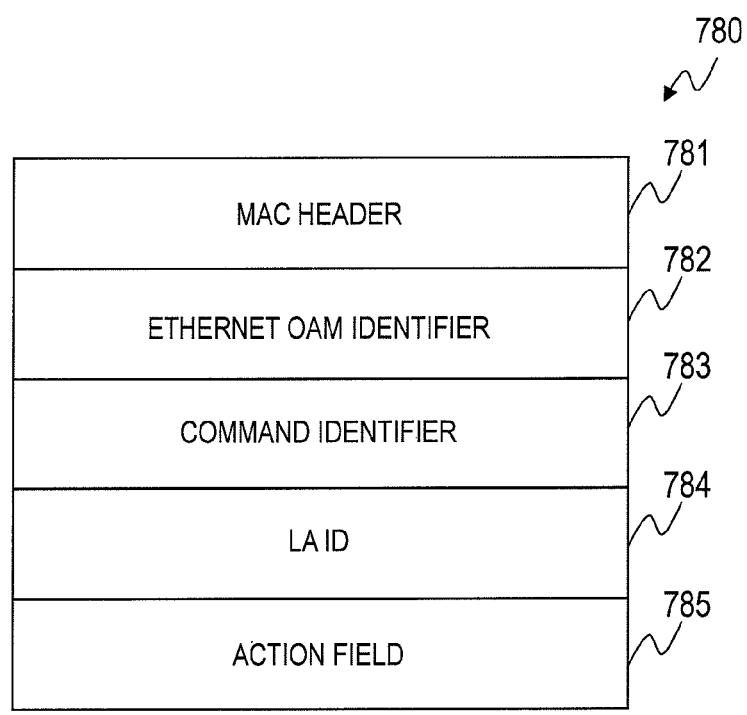
FIG. 24 is an explanatory diagram of a communication frame to be converted by the communication device according to the fourth embodiment of this invention.

When the command communication data generation circuit 721 receives from the IF card 502-*n* a "switching start command" or a "switching request command", the command communication data generation circuit 721 converts the received command into a command communication frame 780 having the format of the Ethernet frame illustrated in FIG. 24. Moreover, when the command communication data generation circuit 721 receives the command communication frame 780, the communication data generation circuit 721 analyzes details thereof, and generates a "switching start command" or a "switching request command" to notify the IF card 502-*n* thereof.

FIG. 24 is an explanatory diagram of the command communication frame 780 to be converted by the communication device 700-*n* according to the fourth embodiment of this invention.

The command communication frame 780 includes a MAC header 781, an Ethernet OAM identifier 782, a command identifier 783, an LA ID 784, and an action field 785.

The MAC header 781 is a field for storing a MAC address of the Ethernet frame.

The Ethernet OAM identifier 782 is an identifier for identifying that the frame is an Ethernet OAM, and is also a command communication frame 780. In the Ethernet OAM, a vendor specific OAM which a communication device manufacturer can uniquely use is defined. This vendor specific OAM can be defined as the command communication frame to be used.

The command identifier 783 is an identifier for identifying whether the frame is a "switching start command" or a "switching request command."

The LA ID 784 is an LA ID for identifying a remote LA logical port 510-*n* which has issued the command.

The action field 785 is used as an "operation state" when the frame is the "switching start command", and is used as a "state" when the frame is the "switching request command."

The communication device 700-*n* can exchange the switching request command and the switching start command by using the command communication IF card 720, and can thus configure the remote LA logical ports 510-*n* to be redundant between the communication devices 700-1 and 700-2 separated physically.

The processing for the frame in the communication device 700-*n* according to this embodiment is the same as the processing in FIG. 6 or 7. The processing of switching the state (ACT/SBY) of the remote LA logical port 510-*n* by the communication device 700-*n* of this embodiment is the same as that in FIGS. 12 to 15 except for such a point that the switching request command and the switching start command are communicated not only via the communication lines 180, but also via the command communication IF cards 720 and the physical ports 724. Therefore, a detailed description of the processing carried out by the communication device 700-*n* according to this embodiment is thus omitted.

In both the conventional link aggregation (such as one described in Japanese Patent Application Laid-open No. 2008-160227) and the conventional protection switching (such as one described in ITU-T G.8031/Y.1342 Ethernet linear Protection Switching), the physical links configured to be redundant need to belong to the same communication device. In contrast, according to this embodiment, an increase in bandwidth by the link aggregation, a decrease in switching time period at the time of failure by the Ethernet APS in the case where the 1:1 redundancy configuration or 1+1 redundancy configuration is applied, and a continued service maintaining the communication bandwidth when the IF card fails can be simultaneously realized in the application form where a relay network constructed by other communication devices exists between the communication devices, and logical ports are configured to be redundant between different communication devices.

It should be noted that this invention is not limited to the above-mentioned embodiments, and can include various modification examples. For example, the above-mentioned embodiments have been described in detail for the sake of easy understanding, and this invention is not limited to a configuration including all the components that have been described. Moreover, a part of a configuration of a certain embodiment can be replaced by a configuration of another embodiment, and to a configuration of a certain embodiment, a configuration of another embodiment can be added. Moreover, another component can be added to, be deleted from, or replace a part of the configuration of each of the embodiments.

What is claimed is:

1. A communication device, comprising:
a plurality of physical ports for transmitting and receiving a signal to and from another communication device,
the communication device holding information for associating each of at least one logical port and at least two physical ports;
a reception unit for identifying, when any one of the plurality of physical ports receives data including user data, one of the at least one logical port as an output destination of the data including the user data based on destination information included in the received data;
a first processing unit for selecting, by a predetermined method in which at least a part of the data including user data is used, one of the at least two physical ports associated with the identified one of the at least one logical port as an output destination of the data including the user data; and
a maintenance unit for generating data for checking a coupling between one of the plurality of physical ports and the another communication device,
wherein the communication device transmits the data for checking the coupling to the another communication device from the one of the plurality of physical ports, and transmits the data including the user data from the selected one of the at least two physical ports as the output destination by the first processing unit; and
wherein:
the reception unit adds, to the received data, data type information representing that the received data is data including the user data, port identification information for identifying the identified one of the at least one logical port, and port type information representing that the port identification information is identification information on one of the at least one logical port, and transmits data to which the data type information, the port identification information, and the port type information are added to the first processing unit;

the maintenance unit adds, to the generated data, data type information representing that the generated data is the data for checking the coupling to the another communication device, port identification information for identifying the one of the plurality of physical ports, and port type information representing that the port identification information is identification information on one of the plurality of physical ports, and transmits data to which the data type information, the port identification information, and the port type information are added to the first processing unit; and the first processing unit avoids changing the port identification information added to the received data when the port identification information added to the received data is the identification information on the one of the plurality of physical ports, and when the port identification information added to the received data is the identification information on the one of the at least one logical port, changes the added port identification information to identification information on the one of the at least two physical ports selected by the predetermined method in which at least the part of the data including the user data is used.

2. The communication device according to claim 1, wherein:

the communication device holds information representing whether each of the at least one logical port is in a first state used to transfer the data including the user data, or a second state auxiliary to a logical port in the first state;

the first processing unit discards the data including the user data when the port identification information added to the data including the user data is the identification information on a logical port in the second state; and the communication device further comprises a switching unit for changing, when a failure of any one of the plurality of physical ports associated with the logical port in the first state is detected based on a result of the transmission and reception of the data for checking the coupling to the another communication device, a state of the logical port associated with the failed one of the plurality of physical ports from the first state to the second state, and changing a state of the logical port paired with the logical port changed to the second state to the first state.

3. The communication device according to claim 2, further comprising:

a plurality of interface devices; and a communication line for coupling between the plurality of interface devices, wherein:

the plurality of interface devices comprise a first interface device and a second interface device;

each of the plurality of interface devices comprises the reception unit, the first processing unit, the maintenance unit, the switching unit, and a plurality of physical ports;

when a failure of any one of the plurality of physical ports of the first interface device associated with the logical port in the first state is detected, the switching unit of the first interface device transmits a switching request command for notifying of identification information on the logical port associated with the failed one of the plurality of physical ports and switching of the logical port due to the failure via the communication line to the second interface device;

the switching unit of the second interface device that has received the switching request command is configured to:

confirm that each of physical ports associated with a logical port identified by the notified identification information is not failed;

transmit a switching start command including the notified identification information on the logical port via the communication line to the first interface device;

transmit data including the notified identification information on the logical port, and notifying of the switching of the logical port due to the failure via any one of the physical ports associated with the logical port identified by the notified identification information to another communication device; and change the state of the logical port identified by the notified identification information from the second state to the first state; and the switching unit of the first interface device that has received the switching start command changes the state of the logical port associated with the failed one of the plurality of physical ports from the first state to the second state.

4. The communication device according to claim 3, wherein the switching unit of the second interface device that has received data notifying of the switching of the logical port due to the failure is configured to:

transmit a switching start command including the notified identification information on the logical port via the communication line to the first interface device; and change the state of the logical port identified by the notified identification information on the logical port from the second state to the first state.

5. The communication device according to claim 3, wherein:

in the first interface device, after the state of the logical port associated with the failed one of the plurality of physical ports is changed from the first state to the second state, when a recovery of the failed one of the plurality of physical ports is detected based on the result of the transmission and reception of the data for checking the coupling to the another communication device, the switching unit of the first interface device transmits a switching request command for notifying of identification information of the logical port associated with the recovered one of the plurality of physical ports, and the switching of the logical port due to the recovery from the failure via the communication line to the second interface device;

the switching unit of the second interface device that has received the switching request command is configured to:

transmit a switching start command including the notified identification information on the logical port via the communication line to the first interface device;

transmit data including the notified identification information on the logical port and notifying of the switching of the port due to the recovery from the failure via any one of the plurality of physical ports associated with the logical port identified by the notified identification information to another communication device; and change the state of the logical port identified by the notified identification information from the first state to the second state; and the switching unit of the first interface device that has received the switching start command changes the state of the logical port associated with the recovered one of the plurality of physical ports from the second state to the first state.

6. The communication device according to claim 5, wherein the switching unit of the second interface device that has received the data notifying of the switching of the logical port due to the recovery from the failure is configured to:
transmit a switching start command including the notified identification information on the logical port via the communication line to the first interface device; and
change the state of the logical port identified by the notified identification information on the logical port from the first state to the second state.

7. The communication device according to claim 1, wherein:
the communication device holds information representing whether each of the at least one logical port is in a first state used to transfer the data including the user data, or a second state auxiliary to a logical port in the first state; and
the communication device further comprises:
a second processing unit for discarding the data including the user data when the identification information on a logical port in the second state is added as the port identification information to the data including the user data received by the one of the plurality of physical ports; and
a switching unit for changing, when a failure of any one of the plurality of physical ports associated with the logical port in the first state is detected based on a result of the transmission and reception of the data for checking the coupling to the another communication device, a state of the logical port associated with the failed one of the plurality of physical ports to the second state, and changing a state of the logical port paired with the logical port changed to the second state to the first state.

8. The communication device according to claim 2, wherein the communication device is also configured to:
detect, when one of the plurality of physical ports has not received the data for checking the coupling to the another communication device for a predetermined time period, the failure of the one of the plurality of physical ports; and
detect, when the one of the plurality of physical ports the failure of which is detected receives the data for checking the coupling to the another communication device at a predetermined interval a predetermined number of times, a recovery of the one of the plurality of physical ports the failure of which is detected.

9. The communication device according to claim 8, further configured wherein:
the data for checking the coupling to the another communication device is assigned with any level; and
the communication device is further configured to:
hold information representing a level assigned to each of the plurality of physical ports;
detect, when one of the plurality of physical ports has not received the data for checking the coupling to the another communication device assigned with a level equal to or lower than a level of the one of the plurality of physical ports for a predetermined time period, a failure of the one of the plurality of physical ports, and discard the received data;
detect, when the one of the plurality of physical ports the failure of which is detected has received the data for checking the coupling to the another communication device assigned with the level equal to or lower than the level of the one of the plurality of physical ports at a predetermined interval a predetermined number of times, a recovery of the one of the plurality of physical ports the failure of which is detected, and discard the received data; and
transmit, when each of the plurality of physical ports receives the data for checking the coupling to the another communication device assigned with a level exceeding the level of the each of the plurality of physical ports, the data to another communication device without using the received data for detecting a failure and recovery of the each of the plurality of physical ports.

10. The communication device according to claim 2, further comprising:
an interface device; and
a command communication interface device coupled via a communication line to the interface device, wherein:
the interface device comprises the reception unit, the first processing unit, the maintenance unit, the switching unit, and the plurality of physical ports;
the command communication interface device comprises a physical port coupled to the command communication interface device of another communication device;
when a failure of any one of the plurality of physical ports of the interface device associated with the logical port in the first state is detected, the switching unit of the interface device transmits a switching request command for notifying of identification information on the logical port associated with the failed one of the plurality of physical ports and switching of the logical port due to the failure via the communication line to the command communication interface;
the command communication interface device transmits data including the switching request command to the command communication interface device of the another communication device;
the command communication interface device that has received the data including the notified switching request command including the notified identification information on the logical port transmits a switching start command to the interface device via the communication line; and
the switching unit of the interface device that has received the switching start command changes the state of the logical port associated with the failed one of the plurality of physical ports from the first state to the second state.

11. The communication device according to claim 2, further comprising:
an interface device; and
a command communication interface device coupled via a communication line to the interface device, wherein:
the interface device comprises the reception unit, the first processing unit, the maintenance unit, the switching unit, and the plurality of physical ports;
the command communication interface device comprises a physical port coupled to the command communication interface device of first another communication device;
the command communication interface device transmits, when the command communication interface device receives from the command communication interface device of the first another communication device data including a switching request command for notifying of identification information on the logical port and switching of the logical port due to a failure, the switching request command included in the received data via the communication line to the interface device;

the switching unit of the interface device that has received the switching request command is configured to:

confirm that each of physical ports associated with a logical port identified by the notified identification information is not failed;

transmit a switching start command including the notified identification information on the logical port via the communication line to the command communication interface device;

transmit data including the notified identification information on the logical port and notifying of the switching of the port due to the failure via any one of the physical ports associated with the logical port identified by the notified identification information to second another communication device; and change the state of the logical port identified by the notified identification information from the second state to the first state; and the command communication interface device transmits data including the switching start command to the command communication interface device of the first another communication device.

12. A method of controlling a communication device, the communication device comprising a plurality of physical ports for transmitting and receiving a signal to and from another communication device, a reception unit, a first processing unit, and a maintenance unit, the communication device holding information for associating each of at least one logical port and at least two physical ports, the method comprising:

a first step of identifying, by the reception unit, when any one of the plurality of physical ports receives data including user data, one of the at least one logical port as an output destination of the data including the user data based on destination information included in the received data;

a second step of selecting, by the first processing unit, by a predetermined method in which at least a part of the data including user data is used, one of the at least two physical ports associated with the identified one of the at least one logical port as an output destination of the data including the user data;

a third step of generating, by the maintenance unit, data for checking a coupling between one of the plurality of physical ports and the another communication device; and a fourth step of transmitting data for checking a coupling to the another communication device from the one of the plurality of physical ports, and transmitting the data including the user data from the selected one of the at least two physical ports as the output destination by the first processing unit; and wherein also:

the first step comprises adding, by the reception unit, to the received data, data type information representing that the received data is data including the user data, port identification information for identifying the identified one of the at least one logical port, and port type information representing that the port identification information is identification information on one of the at least one logical port, and transmitting data to which the data type information, the port identification information, and the port type information are added to the first processing unit;

the third step comprises adding, by the maintenance unit, to the generated data, data type information representing that the generated data is the data for checking the coupling to the another communication device, port identification information for identifying the one of the plurality of physical ports, and port type information representing that the port identification information is identification information on one of the plurality of physical ports, and transmitting data to which the data type information, the port identification information, and the port type information are added to the first processing unit; and the second step comprises avoiding, by the first processing unit, changing the port identification information added to the received data when the port identification information added to the received data is the identification information on the one of the plurality of physical ports, and when the port identification information added to the received data is the identification information on the one of the at least one logical port, changing the added port identification information to identification information on the one of the at least two physical ports selected by the predetermined method in which at least the part of the data including the user data is used.

* * * * *